US012647601B2

(12) United States Patent
Gao et al.

(10) Patent No.: US 12,647,601 B2
(45) Date of Patent: *Jun. 2, 2026

(54) ADJACENT SPATIAL MOTION VECTOR PREDICTOR CANDIDATES IMPROVEMENT

(71) Applicant: Tencent America LLC, Palo Alto, CA (US)

(72) Inventors: Han Gao, Palo Alto, CA (US); Liang Zhao, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,378

(22) Filed: Jul. 18, 2024

(65) Prior Publication Data

US 2024/0373058 A1     Nov. 7, 2024

Related U.S. Application Data

(63) Continuation of application No. 17/941,432, filed on Sep. 9, 2022, now Pat. No. 12,081,792.

(Continued)

(51) Int. Cl.
*H04N 19/139*          (2014.01)
*H04N 19/105*          (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
CPC .............................. H04N 19/52; H04N 19/105
See application file for complete search history.

(56) References Cited

U.S. PATENT DOCUMENTS 10,602,180 B2 *  3/2020  Chen ...................... H04N 19/44
11,202,065 B2   12/2021  Zhang et al.
(Continued)

FOREIGN PATENT DOCUMENTS

WO     WO 2023132564 A1     7/2023

OTHER PUBLICATIONS

Tencent Technology, ISR/WO, PCT/US2022/43327, Feb. 3, 2023, 7 pgs.
Tencent America LLC, India Office Action, IN Patent Application No. 202427017228, Mar. 13, 2026, 7 pgs.

*Primary Examiner* — Irfan Habib
(74) *Attorney, Agent, or Firm* — Morgan, Lewis & Bockius LLP

(57) ABSTRACT

An example method of video decoding includes receiving a video bitstream comprising a plurality of blocks, including a current block. The method also includes generating a motion vector prediction (MVP) list for the current block by interleaving respective spatial motion vector predictors (SMVPs) from left and above neighboring blocks. Generating the MVP list includes inserting a first SMVP into the MVP list, the first SMVP corresponding to a left neighboring block that is left of the current block, and inserting a second SMVP into the MVP list, the second SMVP corresponding to a top neighboring block that is above the current block. The method further includes decoding the current block using an MVP from the MVP list.

20 Claims, 18 Drawing Sheets

1200

1205

1210

Related U.S. Application Data

(60) Provisional application No. 63/349,761, filed on Jun. 7, 2022.

(51) Int. Cl.

| | |
|---|---|
| *H04N 19/176* | (2014.01) |
| *H04N 19/52* | (2014.01) |
| *H04N 19/593* | (2014.01) |
| *H04N 19/88* | (2014.01) |

(52) U.S. Cl.
CPC ......... *H04N 19/176* (2014.11); *H04N 19/593* (2014.11); *H04N 19/88* (2014.11)

(56) References Cited

U.S. PATENT DOCUMENTS

| | | | |
|---|---|---|---|
| 11,218,723 B2* | 1/2022 | Chen | H04N 19/70 |
| 12,244,854 B2* | 3/2025 | Xu | H04N 19/523 |
| 2014/0301467 A1 | 10/2014 | Thirumalai et al. | |
| 2017/0150168 A1 | 5/2017 | Nakamura et al. | |
| 2021/0067798 A1* | 3/2021 | Chujoh | H04N 19/56 |
| 2022/0078410 A1 | 3/2022 | Zhu et al. | |
| 2022/0272323 A1* | 8/2022 | Li | H04N 19/136 |
| 2022/0360814 A1* | 11/2022 | Wu | H04N 19/176 |
| 2023/0103767 A1* | 4/2023 | Chang | H04N 19/88 |
| | | | 375/240.12 |

* cited by examiner

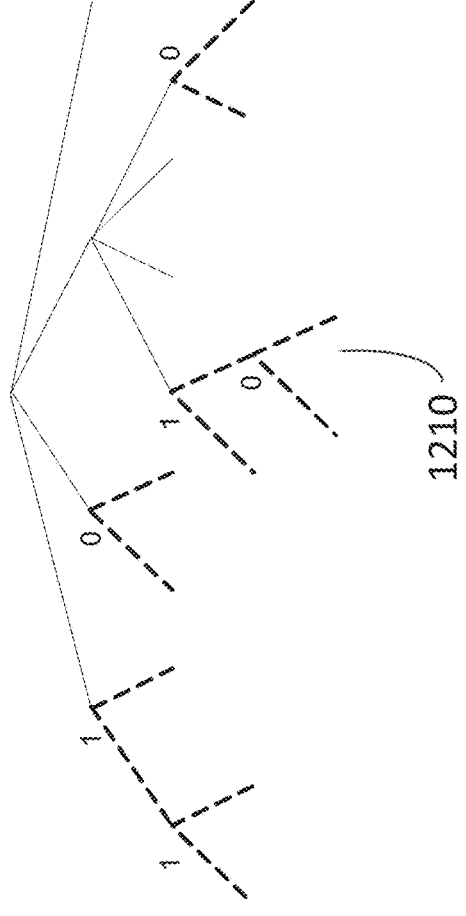
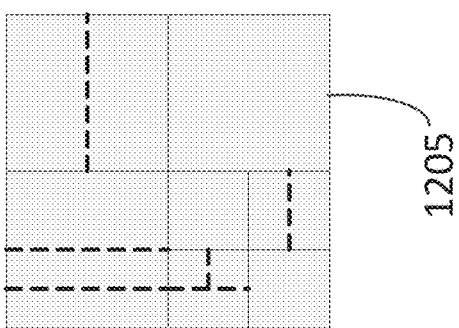
FIG. 1B

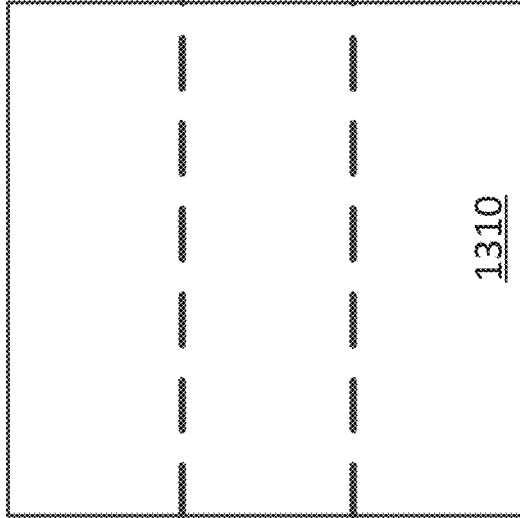
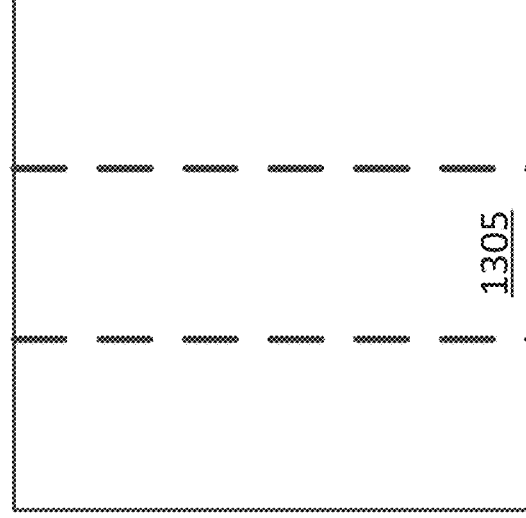
1300
1310
1305
FIG. 1C

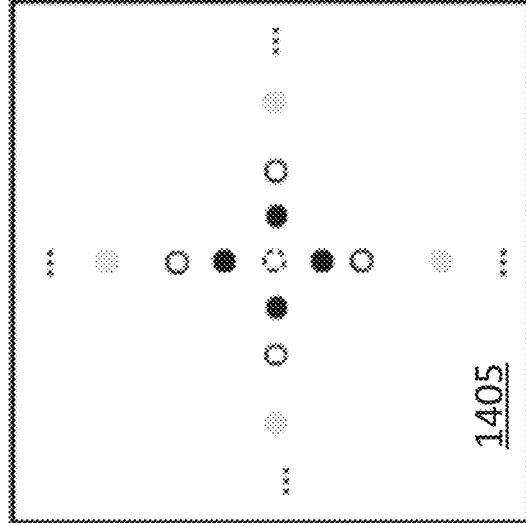
L0 reference
1405
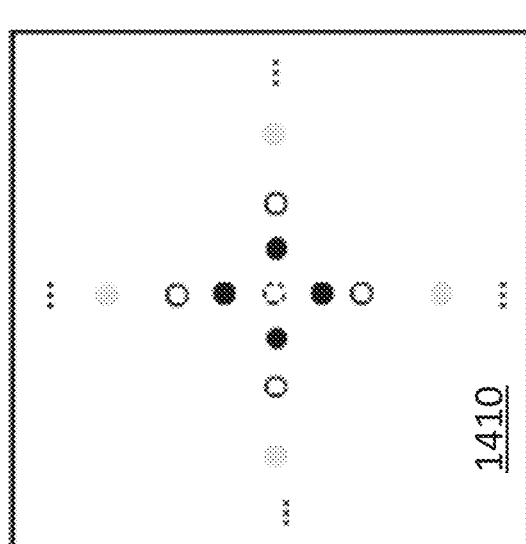
L1 reference
1410
FIG. 1D

1500

1700

200

300
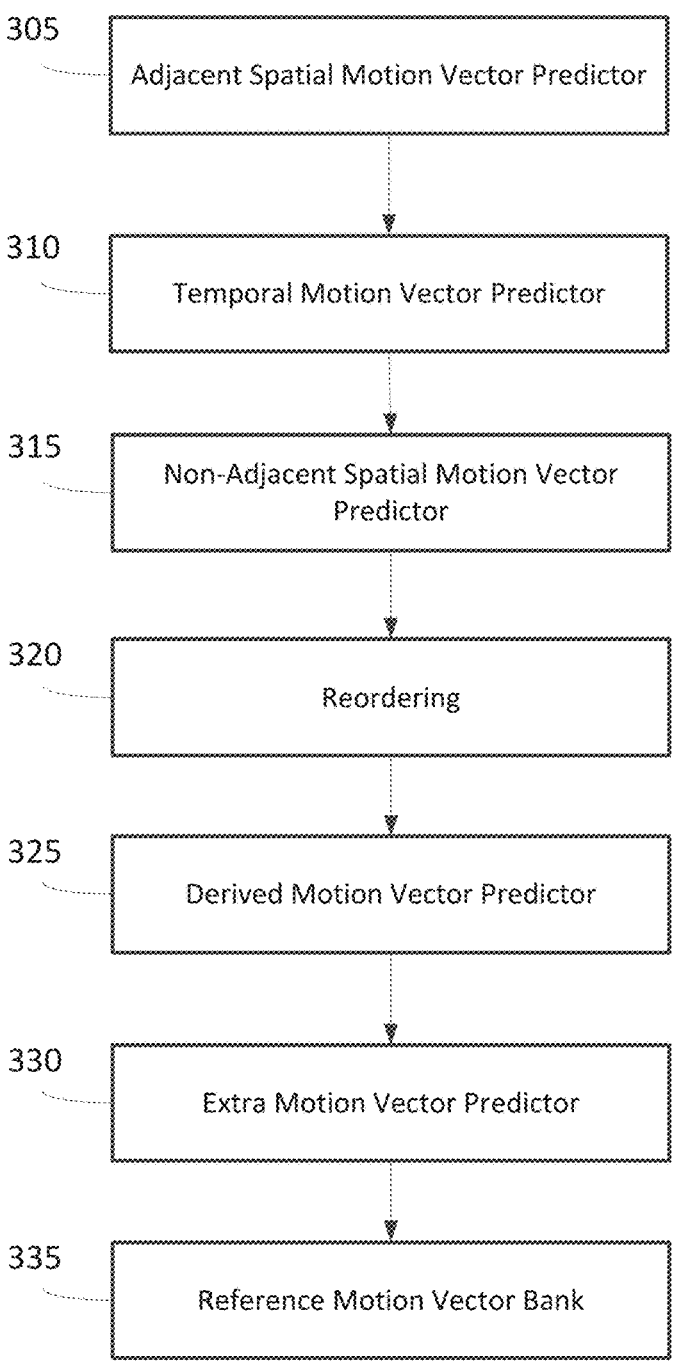
305 — Adjacent Spatial Motion Vector Predictor
310 — Temporal Motion Vector Predictor
315 — Non-Adjacent Spatial Motion Vector Predictor
320 — Reordering
325 — Derived Motion Vector Predictor
330 — Extra Motion Vector Predictor
335 — Reference Motion Vector Bank
FIG. 3

800

ADJACENT SPATIAL MOTION VECTOR PREDICTOR CANDIDATES IMPROVEMENT

CROSS-REFERENCE TO RELATED APPLICATION

This application is a continuation of U.S. patent application Ser. No. 17/941,432, filed on Sep. 9, 2022, which claims priority to U.S. Provisional Patent Application No. 63/349,761, filed on Jun. 7, 2022, each of which is hereby incorporated by reference in its entirety.

FIELD

Embodiments of the present disclosure relate to image and video coding technologies. More specifically, embodiments of the present disclosure relate to improvements in generating motion vector prediction (MVP) lists.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology which could significantly outperform HEVC in compression capability. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team-Joint Video Expert Team) meeting. With careful evaluation, JVET formally launched the standardization of next-generation video coding beyond HEVC, i.e., the so-called Versatile Video Coding (VVC).

SUMMARY

According to embodiments, a method for interleaved motion vector prediction (MVP) for video coding may be provided. The method may be executed by at least one processor an may include generating a MVP candidate list for a current block based on spatial motion vectors associated with neighboring blocks and non-neighboring blocks; inserting a first spatial motion vector predictor (SMVP) associated with an adjacent neighboring block to the left of the current block to the MVP candidate list; inserting a second SMVP associated with an adjacent neighboring block to the top of the current block to the MVP candidate list; and pruning one or more candidates in the MVP candidate list based on determining that the one or more candidates have a same SMVP.

According to embodiments, a device for interleaved motion vector prediction (MVP) for video coding may be provided. The device may include at least one memory configured to store program code; and at least one processor configured to read the program code and operate as instructed by the program code. The program code may include candidate bank by inserting the motion vector associated with the current block into the reference motion vector candidate bank; generating code configured to cause the at least one processor to generate a MVP candidate list for a current block based on spatial motion vectors associated with neighboring blocks and non-neighboring blocks; first inserting code configured to cause the at least one processor to insert a first spatial motion vector predictor (SMVP) associated with an adjacent neighboring block to the left of the current block to the MVP candidate list; second inserting code configured to cause the at least one processor to insert a second SMVP associated with an adjacent neighboring block to the top of the current block to the MVP candidate list; and pruning code configured to cause the at least one processor to prune one or more candidates in the MVP candidate list based on determining that the one or more candidates have a same SMVP.

According to embodiments, a non-transitory computer-readable medium storing instructions may be provided. The instructions, when executed by at least one processor of a device interleaving motion vector prediction (MVP) for video coding may cause the at least one processor to generate a MVP candidate list for a current block based on spatial motion vectors associated with neighboring blocks and non-neighboring blocks; insert a first spatial motion vector predictor (SMVP) associated with an adjacent neighboring block to the left of the current block to the MVP candidate list; insert a second SMVP associated with an adjacent neighboring block to the top of the current block to the MVP candidate list; and prune one or more candidates in the MVP candidate list based on determining that the one or more candidates have a same SMVP.

BRIEF DESCRIPTION OF THE DRAWINGS

FIG. 1B illustrates examples of block partition and tree structures using quad tree plus binary tree block partitioning according to an embodiment of the present disclosure FIG. 1C illustrates examples of vertical center-side triple-tree partitioning and horizontal center-side triple-tree partitioning, according to an embodiment of the present disclosure.

FIG. 1D illustrates examples of search points for merge modes with motion vector difference, according to an embodiment of the present disclosure.

FIG. 1I illustrates an example of additional motion vector candidate generation for a block with a compound reference, according to an embodiment of the present disclosure.

FIG. 3 illustrates a flowchart for constructing a motion vector candidate list, according to an embodiment of the present disclosure.

DETAILED DESCRIPTION

Figure 1A:
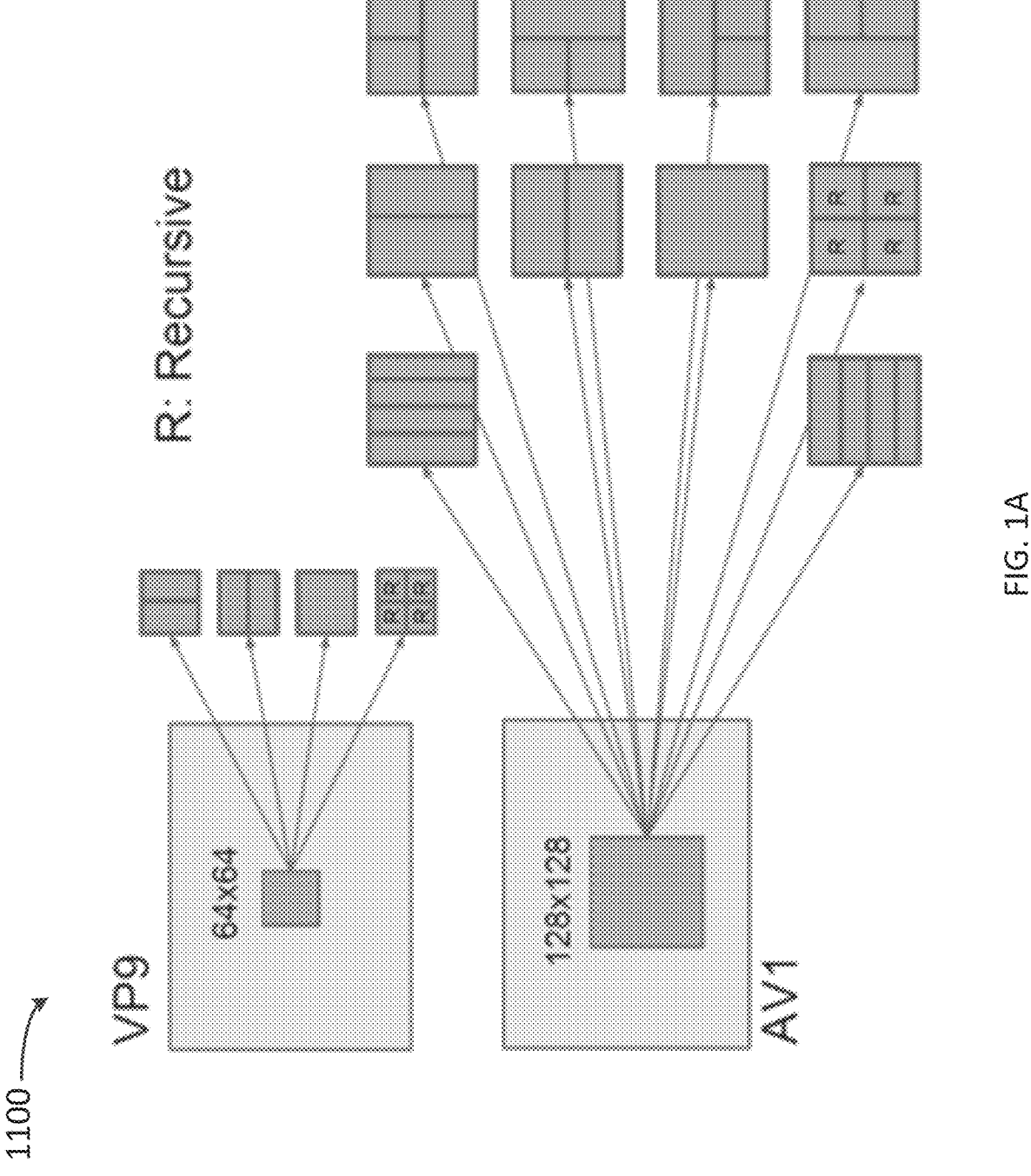
FIG. 1A illustrates examples of partition trees under the AV1 and VPN frameworks according to an embodiment of the present disclosure.

The proposed methods and processes may be used separately or in combination. Embodiments of the present disclosure relate to improvements in generating, maintaining, and updating one or more motion vector prediction (MVP) lists.

According to embodiments of the present disclosure, an interleaved scan order for one or more adjacent and non-adjacent spatial motion vector predictors (SMVP) associated with a current block to utilize the similarity between the current MV and neighboring SMVPs more efficiently.

According to an aspect, a first adjacent SMVP from the left and near the bottom corner may be inserted into the MVP list. A second adjacent SMVP from above and near the right corner, may further be inserted into the MVP list. The above-mentioned operations of inserting an adjacent SMVP from the left interleaved with inserting (also referred to as "scanning") an adjacent SMVP from the top are repeated until all adjacent SMVPs have been used, scanned, inserted, or pruned. Pruning may include not inserting a motion vector into the MVP list or removing a motion vector from the MVP list if the incoming SMVP candidate has the same MVP as one already existing in the MVP list. In some embodiments, partial pruning may be performed instead of full pruning. As an example, for a certain motion vector candidate or for a motion vector candidate satisfying a condition, no pruning operation may be performed.

It may be understood that the SMVP associated with the top left corner candidate can be inserted at last of the adjacent SMVPs or counted as left or above candidate to insert it at any position, or counted as non-adjacent candidate and thus not be inserted during processing the adjacent SMVPs.

According to an embodiment, the motion vectors (also referred to interchangeably with "motion vector predictor" or "candidate") in the MVP list may be weighted, and the weight may be accumulated. In some embodiments, one or more motion vector candidates' weight may not be accumulated. As an example, the weighting associated with the one or more motion vector candidates whose weight may not be accumulated may be zero. In some embodiments, during counting a context for context modeling of a syntax element (e.g., for reference picture index signaling or new MV signaling), one or some candidate motion vectors may not be counted. According to an embodiment, a block size of the candidate may be used during the weighting process or accumulation.

In some embodiments, in addition to the above-mentioned features, the interleaved scanning and/or inserting of the candidates may begin by inserting a first adjacent SMVP from the top and near the right corner may be inserted into the MVP list followed by a second adjacent SMVP from left and near the bottom corner. Such an embodiment may enable a more efficient utilization of the MVP list to include more relevant neighbors when the above-neighbors are more frequently used. As an example, this scanning order going from top to left may benefit when the video content is vertical or contains vertical motions.

In some embodiments, in addition to the above-mentioned features, the interleaved scanning and/or inserting of the candidates may begin by inserting a first adjacent SMVP from the left and near the bottom corner into the MVP list followed by a second adjacent SMVP from top and near the right corner. The next set of interleaved SMVPs may include SMVPs associated with non-adjacent blocks. Such an embodiment may enable a more efficient utilization of the MVP list to include more relevant non-adjacent neighbors when the adjacent-neighbors along the top and left edges of the current block may have a similar SMVP compared to the current block.

In some embodiments, in addition to the above-mentioned features, the interleaved scanning and/or inserting of the candidates may begin by inserting a first adjacent SMVP from the top and near the right corner into the MVP list followed by a second adjacent SMVP from left and near the bottom corner. The next set of interleaved SMVPs may include SMVPs associated with non-adjacent blocks. Such an embodiment may enable a more efficient utilization of the MVP list to include more relevant non-adjacent neighbors when the adjacent-neighbors along the top and left edge of the current block may have a similar SMVP compared to the current block.

According to an embodiment, whether a SMVP associated with an adjacent neighbor from the top is added to the MVP list before SMVP associated with an adjacent neighbor from the left may be based on coded information or any information that may be available for both encoder and decoder when coding the current block, including, but not limited block shape, block size, block aspect ratio. As an example, when the block width is greater than block height, the left neighbors are added first to the MVP list. As another example, when the block height is greater than block width, the left neighbors are added first to the MVP list.

Block Partitioning in VP9 and AV1

FIG. 1A is a diagram 1100 of examples of partitioning trees under VP9 and AV1. As shown in the top half of FIG. 1A, VP9 may use a 4-way partition tree starting from the 64×64 level down to 4×4 level, with some additional restrictions for blocks 8×8. It may be understood that partitions designated as "R" refer to as recursive—the same partition tree may be repeated at a lower scale until the lowest 4×4 level is reached.

AV1 may not only expand the partition-tree to a 10-way structure as shown in the lower half of FIG. 1A, AV1 also increases the largest size (referred to as superblock in VP9/AV1 parlance) to start from 128×128. It may be understood that the 10 may structure may include 4:1/1:4 rectangular partitions that did not exist in VP9. The rectangular partitions may not be further subdivided. In addition, AV1 adds more flexibility to the use of partitions below 8×8 level, in the sense that 2×2 chroma inter prediction now becomes possible on certain cases.

Block Partitioning in HEVC

In HEVC, a coding tree unit (CTU) is split into coding units (CUs) by using a quad tree (QT) structure denoted as coding tree to adapt to various local characteristics. The decision on whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad tree structure like the coding tree for the CU. A feature of the HEVC structure is that it has the multiple partition conceptions including CU, PU, and TU. In HEVC, a CU or a TU can only be square shape, while a PU may be square or rectangular shape for an inter predicted block. In HEVC, one coding block may be further split into four square sub-blocks, and transform is performed on each sub-block, i.e., TU. Each TU can be further split recursively (using quad tree split) into smaller TUs, which is called Residual Quad Tree (RQT). At picture boundary, HEVC employs implicit quad tree split so that a block will keep quad tree splitting until the size fits the picture boundary. One of key features of the HEVC structure is that it has the multiple partition conceptions including CU, PU, and TU.

Block Partitioning in Versatile Video Coding (VVC)

Block partitioning structure using quad tree (QT) plus binary tree (BT)

The QTBT structure may the concepts of multiple partition types, i.e. it may remove the separation of the CU, PU and TU concepts, and support more flexibility for CU partition shapes. In the QTBT block structure, a CU may have either a square or rectangular shape. As shown in FIG. 1B using the tree 1205, a coding tree unit (CTU) is first partitioned by a quad tree structure. The quad tree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. Thus the CU, PU and TU have the same block size in the QTBT coding block structure. In the JEM, a CU may consist of coding blocks (CBs) of different color components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices. The following parameters may be defined for the QTBT partitioning scheme—CTU size: the root node size of a quad tree; the same concept as in HEVC; MinQTSize: the minimum allowed quad tree leaf node size; MaxBTSize: the maximum allowed binary tree root node size; MaxBTDepth: the maximum allowed binary tree depth; and MinBTSize: the minimum allowed binary tree leaf node size In one example of the QTBT partitioning structure, the CTU size may be set as 128×128 luma samples with two corresponding 64×64 blocks of chroma samples, the MinQTSize may be set as 16×16, the MaxBTSize may be set as 64×64, the MinBTSize (for both width and height) may be set as 4×4, and the MaxBTDepth is set as 4. The quad tree partitioning may be applied to the CTU first to generate quad tree leaf nodes. The quad tree leaf nodes may have a size from 16×16 (i.e., the MinQTSize) to 128×128 (i.e., the CTU size). If the leaf quad tree node is 128×128, it will not be further split by the binary tree since the size exceeds the MaxBTSize (i.e., 64×64). Otherwise, the leaf quad tree node could be further partitioned by the binary tree. Therefore, the quad tree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

As seen in FIG. 1B, block 1205 illustrates an example of block partitioning by using QTBT, and FIG. 1B, binary tree 1210, illustrates the corresponding tree representation. The solid lines indicate quad tree splitting and dotted lines indicate binary tree splitting. In each splitting (i.e., non-leaf) node of the binary tree, one flag may be signalled to indicate which splitting type (i.e., horizontal or vertical) is used, where 0 may indicate horizontal splitting and 1 may indicate vertical splitting. For the quad tree splitting, there is no need to indicate the splitting type since quad tree splitting always splits a block both horizontally and vertically to produce 4 sub-blocks with an equal size.

In addition, the QTBT scheme supports the flexibility for the luma and chroma to have a separate QTBT structure. Currently in related art, for P and B slices, the luma and chroma CTBs in one CTU share the same QTBT structure. However, for I slices, the luma CTB is partitioned into CUs by a QTBT structure and the chroma CTBs are partitioned into chroma CUs by another QTBT structure. This means that a CU in an I slice may consist of a coding block of the luma component or coding blocks of two chroma components, and a CU in a P or B slice consists of coding blocks of all three color components.

In HEVC, inter prediction for small blocks may be restricted to reduce the memory access of motion compensation, such that bi-prediction may not be supported for 4×8 and 8×4 blocks, and inter prediction is not for 4×4 blocks. In the QTBT as implemented in the JEM-7.0, these restrictions are removed.

Block Partitioning Structure Using Ternary Tree (TT)

In VVC, a Multi-Type-Tree (MTT) structure may be included, which adds the horizontal and vertical center-side triple-trees on top of QTBT, as shown in FIG. 1C, at block 1305 and block 1310 respectively. An advantage of TT partitioning is that it is a complement to quad tree and binary tree partitioning; TT partitioning is also able to capture objects which locate in block center while quad tree and binary tree are always split along block center. Further, since the width and height of the partitions of the proposed TT partitions are always power of 2, no additional transforms are needed. The design of two-level tree is mainly motivated by complexity reduction. Theoretically, the complexity of traversing of a tree is $T^D$, where T denotes the number of split types, and D is the depth of tree.

Merge Mode with Motion Vector Difference (MMVD)

In addition to merge mode, where the implicitly derived motion information is directly used for prediction samples generation of the current CU, the merge mode with motion vector differences (MMVD) is introduced in VVC. A MMVD flag may be signaled right after sending a skip flag and merge flag to specify whether MMVD mode is used for a CU.

In MMVD, after a merge candidate is selected, it may further be refined by the signalled MVDs information. The further information may include a merge candidate flag, an index to specify motion magnitude, and an index for indication of motion direction. In MMVD mode, one for the first two candidates in the merge list is selected to be used as MV basis. The merge candidate flag may be signalled to specify which one is used.

Distance index specifies motion magnitude information and indicates the pre-defined offset from the starting point. As shown in FIG. 1D, an offset may be added to either horizontal component or vertical component of starting MV. The relation of distance index and pre-defined offset may be specified in Table 1.

TABLE 1

| The relation of distance index and pre-defined offset | | | | | | | | |
|---|---|---|---|---|---|---|---|---|
| Distance IDX | 0 | 1 | 2 | 3 | 4 | 5 | 6 | 7 |
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 2.

TABLE 2

| Sign of MV offset specified by direction index | | | | |
|---|---|---|---|---|
| Direction IDX | 00 | 01 | 10 | 11 |
| x-axis | + | – | N/A | N/A |
| y-axis | N/A | N/A | + | – |

It may be noted that the meaning of MVD sign could be variant according to the information of starting MVs. When the starting MVs is an uni-prediction MV or bi-prediction MVs with both lists point to the same side of the current picture the sign in Table 2 specifies the sign of MV offset added to the starting MV. As an example, when the POCs of two references are both larger than the POC of the current picture, or are both smaller than the POC of the current picture. When the starting MVs is bi-prediction MVs with the two MVs point to the different sides of the current picture and the difference of POC in list 0 is greater than the one in list 1, the sign in Table 2 specifies the sign of MV offset added to the list 0 MV component of starting MV and the sign for the list 1 MV has opposite value. As an example, the POC of one reference is larger than the POC of the current picture, and the POC of the other reference is smaller than the POC of the current picture, the sign of MV offset added to the list 0 MV component of starting MV and the sign for the list 1 MV has opposite value. Otherwise, if the difference of POC in list 1 is greater than list 0, the sign in Table 2 specifies the sign of MV offset added to the list 1 MV component of starting MV and the sign for the list 0 MV has opposite value.

The MVD may be scaled according to the difference of POCs in each direction. If the differences of POCs in both lists are the same, no scaling may be done. Otherwise, if the difference of POC in list 0 is larger than the one of list 1, the MVD for list 1 may be scaled. If the POC difference of L1 is greater than L0, the MVD for list 0 may be scaled in the same way. If the starting MV is uni-predicted, the MVD may be added to the available MV.

Symmetric MVD Coding

In VVC, besides the normal unidirectional prediction and bi-directional prediction mode MVD signaling, symmetric MVD mode for bi-directional MVD signaling may be applied. In the symmetric MVD mode, motion information including reference picture indices of both list 0 and list 1 and MVD of list 1 may not be signaled but may be derived.

The decoding process of the symmetric MVD mode at slice level may be as follows. At slice level, variables BiDirPredFlag, RefIdxSymL0 and RefIdxSymL1 are derived. If mvd_l1_zero_flag is 1, BiDirPredFlag may be set equal to 0. Otherwise, if the nearest reference picture in list 0 and the nearest reference picture in list 1 form a forward and backward pair of reference pictures or a backward and forward pair of reference pictures, BiDirPredFlag may be set to 1, and both list 0 and list 1 reference pictures may be short-term reference pictures. Otherwise BiDirPredFlag is set to 0.

The decoding process of the symmetric MVD mode at CU level may be as follows. At CU level, a symmetrical mode flag indicating whether symmetrical mode may be used or may not be explicitly signaled if the CU is bi-prediction coded and BiDirPredFlag is equal to 1. When the symmetrical mode flag is true, only mvp_l0_flag, mvp_l1_flag and MVD0 are explicitly signaled. The reference indices for list 0 and list 1 are set equal to the pair of reference pictures, respectively. MVD1 is set equal to (−MVD0).

Inter Mode Coding in CWG-B018

In AV1, for each coded block in inter frame, if the mode of current block is not skip mode but inter-coded mode, then another flag may be signaled to indicate whether single reference mode or compound reference mode is used to current block.

Single mode may include the prediction block being generated by one motion vector in single reference mode. The following modes may be signaled for single reference case: (1) NEARMV—use one of the motion vector predictors (MVP) in the list indicated by a DRL (Dynamic Reference List) index; (2) NEWMV—use one of the motion vector predictors (MVP) in the list signaled by a DRL index as reference and apply a delta to the MVP; and (3) GLOBALMV—use a motion vector based on frame-level global motion parameters.

Prediction block that is generated by weighted averaging two prediction blocks may be derived from two motion vectors in compound reference mode. The following modes may be signaled for compound reference case: (1) NEAR_NEARMV—use one of the motion vector predictors (MVP) in the list signaled by a DRL index; (2) NEAR_NEWMV—use one of the motion vector predictors (MVP) in the list signaled by a DRL index as reference and send a delta MV for the second MV; (3) NEW_NEARMV—use one of the motion vector predictors (MVP) in the list signaled by a DRL index as reference and send a delta MV for the first MV; (4) NEW_NEWMV—use one of the motion vector predictors (MVP) in the list signaled by a DRL index as reference and send a delta MV for both MVs; and (5) GLOBAL_GLOBALMV—use MVs from each reference based on their frame-level global motion parameters.

Motion Vector Difference Coding in AV1

AV1 allows ⅛ pixel motion vector precision (or accuracy), and the following syntaxes may be used to signal the motion vector difference in reference frame list 0 or list 1—(1) mv_joint specifies which components of the motion vector difference are non-zero—0 indicates there is no non-zero MVD along either horizontal or vertical direction, 1 indicates there is non-zero MVD only along horizontal direction, 2 indicates there is non-zero MVD only along vertical direction, 3 indicates there is non-zero MVD along both horizontal and vertical direction; (2) mv_sign specifies whether motion vector difference is positive or negative; (3) mv_class specifies the class of the motion vector difference. As shown in Table 3, a higher class means that the motion vector difference has a larger magnitude; (4) mv_bit specifies the integer part of the offset between motion vector difference and starting magnitude of each MV class; (5) mv_fr specifies the first 2 fractional bits of the motion vector difference; and (6) mv_hp specifies the third fractional bit of the motion vector difference.

TABLE 3

Magnitude class for motion vector difference

| 1. MV class | 2. Magnitude of MVD |
|---|---|
| 3. MV_CLASS_0 | 4. (0, 2] |
| 5. MV_CLASS_1 | 6. (2, 4] |
| 7. MV_CLASS_2 | 8. (4, 8] |
| 9. MV_CLASS_3 | 10. (8, 16] |
| 11. MV_CLASS_4 | 12. (16, 32] |
| 13. MV_CLASS_5 | 14. (32, 64] |
| 15. MV_CLASS_6 | 16. (64, 128] |
| 17. MV_CLASS_7 | 18. (128, 256] |
| 19. MV_CLASS_8 | 20. (256, 512] |
| 21. MV_CLASS_9 | 22. (512, 1024] |
| 23. MV_CLASS_10 | 24. (1024, 2048] |

Adaptive MVD Resolution in CWG-B092

For NEW_NEARMV and NEAR_NEWMV mode, the precision of the MVD may depend on the associated class and the magnitude of MVD. Firstly, fractional MVD is allowed only if MVD magnitude is equal to or less than one-pixel. Secondly, only one MVD value is allowed when the value of the associated MV class is equal to or greater than MV_CLASS_1. The MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5). In addition, if current block is coded as NEW_NEARMV or NEAR_NEWMV mode, one context may be used for signaling mv_joint or mv_class. Otherwise, another context may be used for signaling mv_joint or mv_class.

TABLE 4

Adaptive MVD in each MV magnitude class

| 25. MV class | 26. Magnitude of MVD |
|---|---|
| 27. MV_CLASS_0 | 28. (0, 1], {2} |
| 29. MV_CLASS_1 | 30. {4} |
| 31. MV_CLASS_2 | 32. {8} |
| 33. MV_CLASS_3 | 34. {16} |
| 35. MV_CLASS_4 | 36. {32} |
| 37. MV_CLASS_5 | 38. {64} |
| 39. MV_CLASS_6 | 40. {128} |
| 41. MV_CLASS_7 | 42. {256} |
| 43. MV_CLASS_8 | 44. {512} |
| 45. MV_CLASS_9 | 46. {1024} |
| 47. MV_CLASS_10 | 48. {2048} |

Joint MVD Coding (JMVD) in CWG-B092

A new inter coded mode, named as JOINT_NEWMV, may be applied to indicate whether the MVDs for two reference lists are jointly signaled. If the inter prediction mode is equal to JOINT_NEWMV mode, MVDs for reference list 0 and reference list 1 are jointly signaled. Therefore, only one MVD, named as joint_mvd, is signaled and transmitted to the decoder, and the delta MVs for reference list 0 and reference list 1 are derived from joint_mvd.

JOINT_NEWMV mode is signaled together with NEAR_NEARMV, NEAR_NEWMV, NEW_NEARMV, NEW_NEWMV, and GLOBAL_GLOBALMV mode. No additional contexts are added.

When JOINT_NEWMV mode is signaled, and the POC distance between two reference frames and current frame is different, MVD is scaled for reference list 0 or reference list 1 based on the POC distance. To be specific, the distance between reference frame list 0 and current frame may be td0 and the distance between reference frame list 1 and current frame is noted as td1. If td0 is equal to or larger than td1, joint_mvd is directly used for reference list 0 and the mvd for reference list 1 is derived from joint_mvd based on the equation (1).

$$derived\_mvd = \frac{td1}{td0} * joint\_mvd \tag{1}$$

Otherwise, if td1 equal to or larger than td0, joint_mvd is directly used for reference list 1 and the mvd for reference list 0 is derived from joint_mvd based on the equation (2).

$$derived\_mvd = \frac{td0}{td1} * joint\_mvd \tag{2}$$

Improvement for Adaptive MVD Resolution in CWG-C011

A new inter coded mode, named as AMVDMV, may added to single reference case. When AMVDMV mode is selected, it indicates that AMVD is applied to signal MVD. One flag, named as amvd_flag, is added under JOINT_NEWMV mode to indicate whether AMVD is applied to joint MVD coding mode or not. When adaptive MVD resolution is applied to joint MVD coding mode, named as joint AMVD coding, MVD for two reference frames may be jointly signaled and the precision of MVD is implicitly determined by MVD magnitudes. Otherwise, MVD for two (or more than two) reference frames are jointly signaled, and conventional MVD coding is applied.

Adaptive Motion Vector Resolution (AMVR) in CWG-C012 and CWG-C020

The AMVR was initially proposed in CWG-C012 where total 7 MV precisions (8, 4, 2, 1, ½, ¼, ⅛) are supported. For each prediction block, AVM encoder may search all the supported precision values and signals the best precision to the decoder.

To reduce the encoder run-time, two precision sets are supported. Each precision set contains 4-pre-defined precisions. The precision set may be adaptively selected at the frame level based on the value of maximum precision of the frame. Same as AV1, the maximum precision may be signaled in the frame header. Table 5 summarizes the supported precision values based on the frame level maximum precision.

TABLE 5

| Supported MV precisions in two sets | |
| --- | --- |
| Frame level maximum precision | Supported MV precisions |
| ⅛ | ⅛, ½, 1, 4 |
| ¼ | ¼, 1, 4, 8 |

In current AVM software (similar to AV1), there is a frame level flag to indicate if the MVs of the frame contains sub-pel precisions or not. The AMVR is enabled only if the value of cur_frame_force_integer_mv flag is 0. In the AMVR, if precision of the block is lower than the maximum precision, motion model and interpolation filters may not be signaled. If the precision of a block is lower than the maximum precision, motion mode is inferred to translation motion and interpolation filter may infer to REGULAR interpolation filter. Similarly, if the precision of the block is either 4-pel or 8-pel, inter-intra mode is not signaled and inferred to be 0.

Motion Vector Predictor List in AV1 and AVM

The spatial motion vector predictor (SMVP), both adjacent and non-adjacent SMVP), temporal motion vector predictor, extra MV candidate in AV1 and additionally derived MVP, and reference bank MVP are additional added in the AVM design. A stack with fixed size will be generated both at the encoder and decoder side to store the MVP, which is known as motion vector predictor list.

Spatial Motion Vector Predictor (SMVP)

Figure 1E:
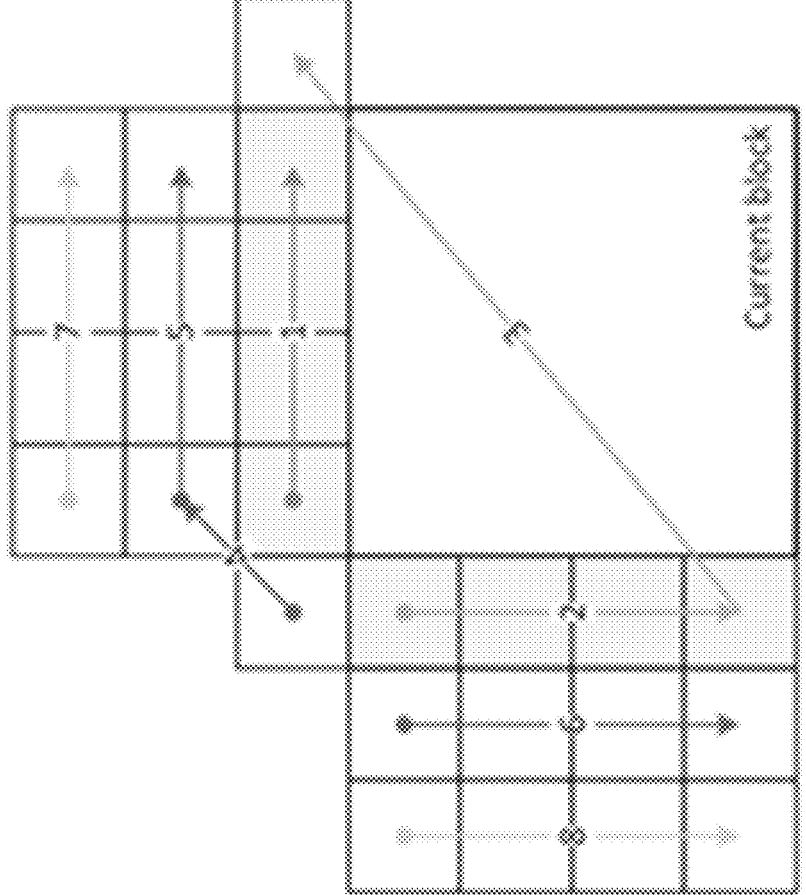
FIG. 1E illustrates an example of spatial motion vector neighbors, according to an embodiment of the present disclosure.

Spatial motion vector (MV) predictors are derived from spatial neighboring blocks, including adjacent spatial neighboring blocks, which are direct neighbors of the current block to the top and left sides, as well as non-adjacent spatial neighboring blocks, which are close to, but not directly adjacent to the current block. An example of a set of spatial neighboring blocks for a luma block is illustrated in FIG. 1E, wherein each spatial neighboring block is an 8×8 block. The spatial neighboring blocks are examined to find one or more MVs that are associated with the same reference frame index as the current block. For the current block, the search order of spatial neighboring 8×8 luma blocks is as indicated by the numbers 1-8 in FIG. 5: (1) The top adjacent row is checked from left to right; (2) The left adjacent column is checked from top to bottom; (3) The top-right neighboring block is checked; (4) The top-left block neighboring block is checked; (5) The first top non-adjacent row is checked from left to right; (6) The first left non-adjacent column is checked from top to bottom; (7) The second top non-adjacent row is checked from left to right; and (8) The second left non-adjacent column is checked from top to bottom.

The adjacent candidates (1-3 in FIG. 1E.) are put into the MV predictor list before TMVP, the non-adjacent (also known as outer candidates, i.e., candidates 4-8 in FIG. 1E.) are put into the MV predictor list after TMVP. All the SMVP candidates should have the same reference picture as the current block. That is, if the current block has single reference picture, the MVP candidate with single reference picture and this ref picture is same as the ref picture of the current block, or with compound reference pictures (2 reference picture) and one of the ref pictures is same as the ref picture of the current block, this MVP candidate will be put into the MV predictor list. If the current block has two reference pictures, only when the MVP candidate that have two ref pictures and these two ref pictures are the same as the ref pictures of the current block, this MVP candidate is put into the predictor list.

Temporal Motion Vector Predictor (TMVP)

In addition to spatial neighboring blocks, MV predictors known as temporal MV predictors may also be derived using collocated blocks in reference frames. To generate temporal MV predictors, the MVs of reference frames are first stored with reference indices associated with the respective reference frames. Thereafter, for each 8×8 block of the current frame, the MVs of a reference frame whose trajectories pass through the 8×8 block are identified and stored with the reference frame index in a temporal MV buffer. For inter prediction using a single reference frame, regardless whether the reference frame is a forward or backward reference frame, the MVs are stored in 8×8 units for performing the temporal motion vector prediction of a future frame. For compound inter prediction, only the forward MVs are stored in 8×8 units for performing the temporal motion vector prediction of a future frame.

Figure 1F:
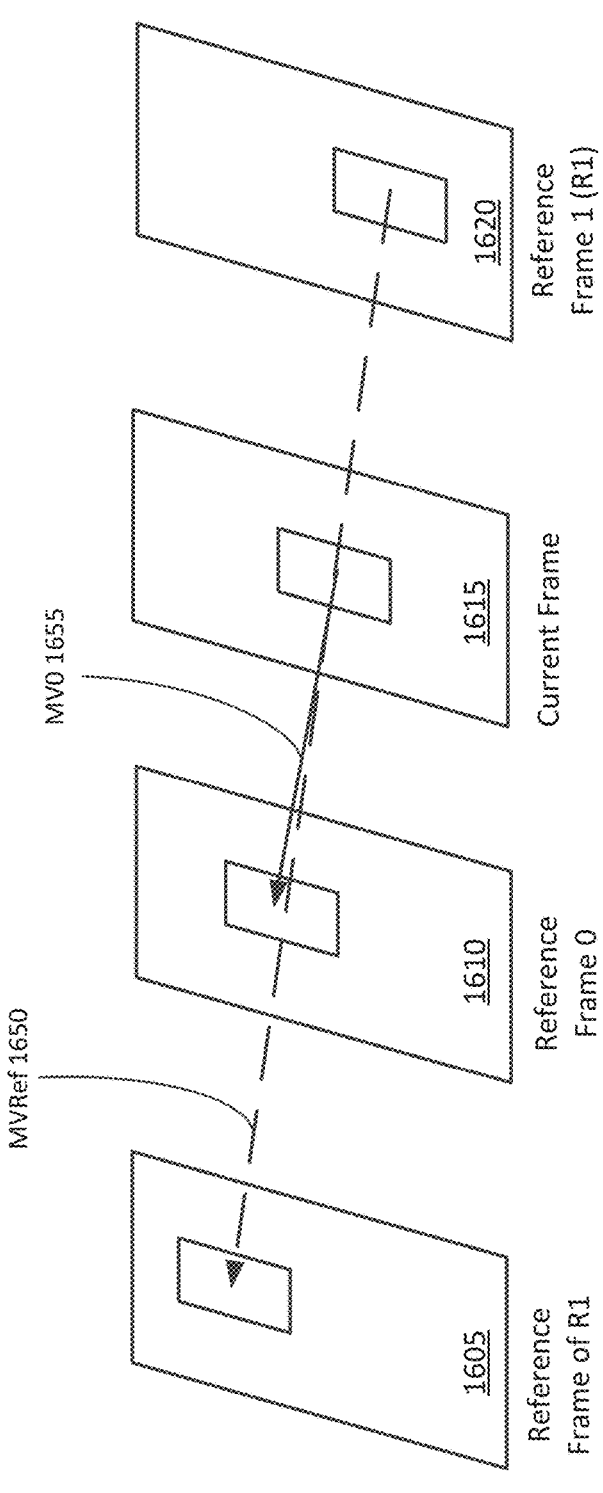
FIG. 1F illustrates an example of motion field estimation by linear projection, according to an embodiment of the present disclosure.
Figure 1G:
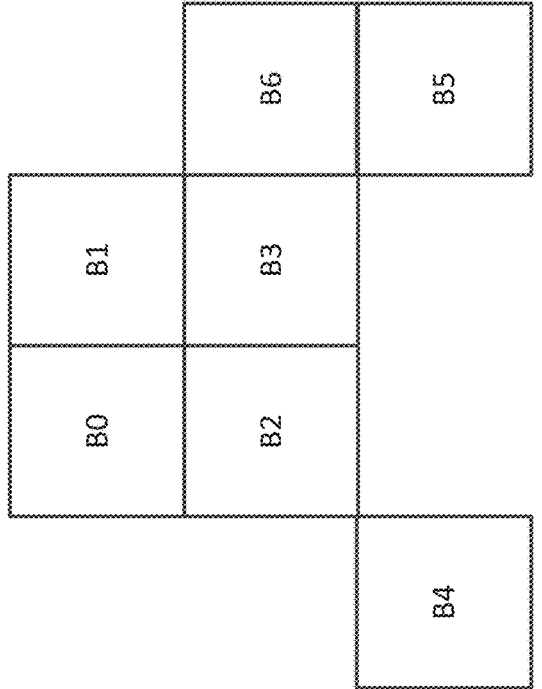
FIG. 1G illustrates an example of block positions for deriving temporal motion vector predictors, according to an embodiment of the present disclosure.

Referring to FIG. 1G, the MV of reference frame 1 (R1) 1620 i.e., MVref 1650 points from frame 1 (R1) 1620. In doing so, MVref 1650 passes through an 8×8 block (block in current frame 1615 and block in reference frame 0 1610 of the current frame. MVref is stored in the temporal MV buffer associated with this 8×8 block. During the motion projection process for deriving the temporal MV predictor, the reference frames may be scanned in a pre-defined order: LAST_FRAME, BWDREF_FRAME, ALTREF_FRAME, ALTREF2_FRAME, and LAST2_FRAME. The MVs from a higher indexed reference frame (in scanning order) does not replace the previously identified MVs assigned by a lower indexed reference frame (in scanning order).

Given the pre-defined block coordinates, the associated MVs stored in the temporal MV buffer are identified and projected on to the current block to derive a temporal MV predictor that points from the current block to its reference frame, e.g., MV0 in FIG. 1F.

Referring to FIG. 1G, the pre-defined block positions for deriving temporal MV predictors of a 16×16 block are shown. Up to seven blocks are checked for valid temporal MV predictors. The temporal MV predictors are checked after the adjacent spatial MV predictors but before the non-adjacent spatial MV predictors.

For the derivation of MV predictors, all the spatial and temporal MV candidates may be pooled, and each predictor may be assigned a weight that is determined during the scanning of the spatial and temporal neighboring blocks. Based on the associated weights, the candidates may be sorted and ranked, and up to four candidates are identified and added to an MV predictor list. This list of MV predictors is also referred to as a dynamic reference list (DRL), which is further used in dynamic MV prediction modes, as described in the next subsection.

Extra Search MVP for Extra MVP Candidates

If the MVP list is still not full, and extra search will be performed and the extra MVP candidates will be used to fill the MVP list. The extra MVP candidates includes for example global MV, zero MV, combined compound MVs without scaling, etc.

MVP Candidate Reordering Process

The adjacent SMVP candidates, TMVP candidates, and non-adjacent SMVP candidates that are added in the MVP list will be reordered. Based on the current design in AV1 and AVM, the reordering process is based on a weight of each candidate. The weight of a candidate is pre-defined depending on the overlapped area of the current block and the candidate blocks.

Derived MVP Candidates

The derived MVP candidates are adopted in AVM reference software by the proposal CWG-B049, which contains both derived MVP for single reference picture and compound mode.

Single Inter Prediction

Figure 1H:
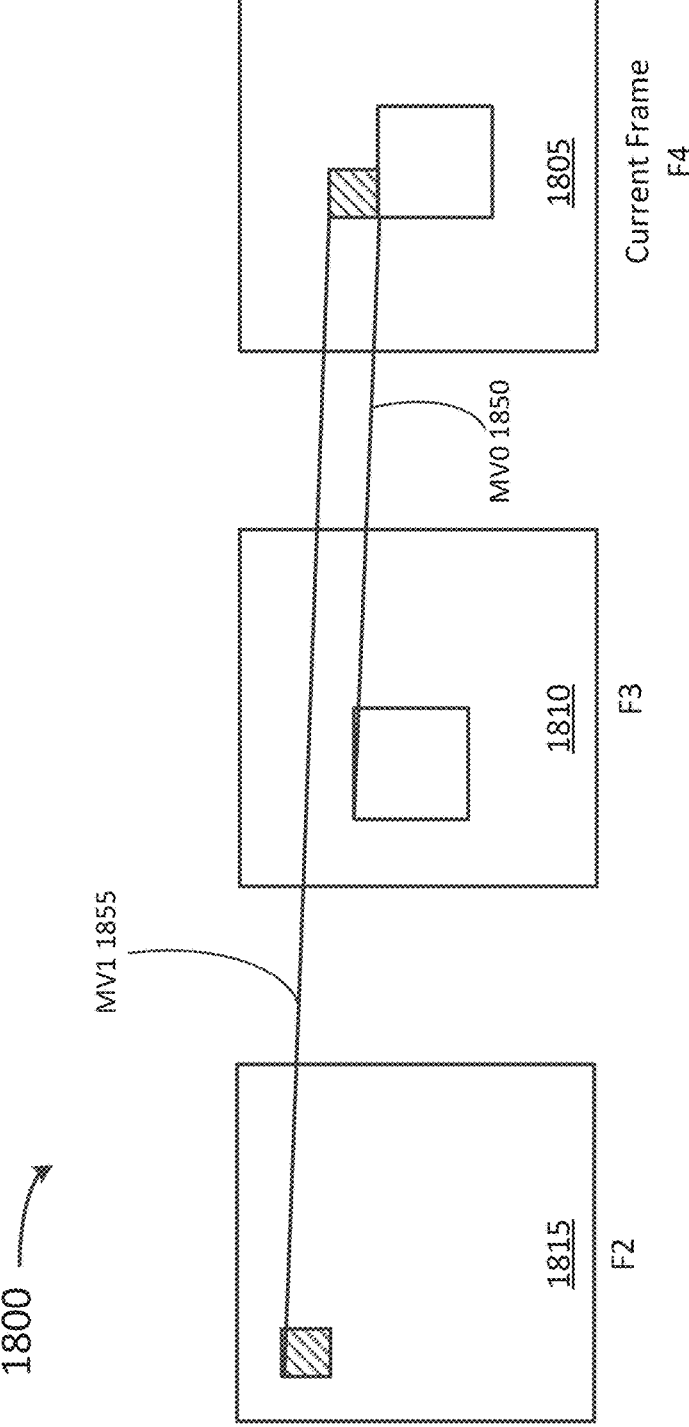
FIG. 1H illustrates an example of additional motion vector candidate generation for a block with a single reference, according to an embodiment of the present disclosure.
Figure 11:
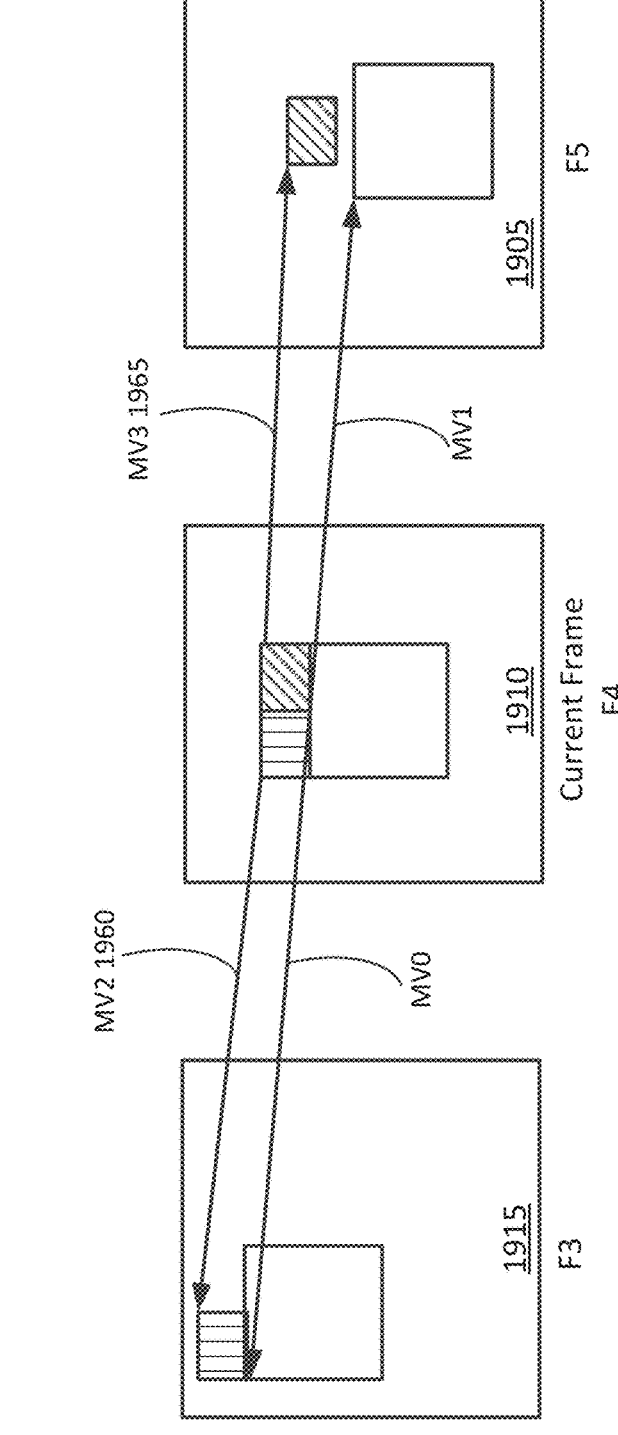

If the reference frame of neighboring block is different from the one of current block, but they are in the same direction, then a temporal scaling algorithm can be utilized to scale its MV to that reference frame in order to form a MVP for the motion vector of current block. As shown in FIG. 1H, the mv1 1855 from neighboring block (shaded block) may be utilized to derive the MVP for the motion vector, mv0 1850, of current block with temporal scaling.

Compound Inter Prediction

Composed MVs from different neighboring blocks are exploited to derive a MVP of the current block, but the reference frames of the composed MVs need to be the same as current block. As shown in FIG. 1I, the composed MV (mv2 1960, mv3 1965) have the same reference frames as current block, but they are from different neighboring blocks.

Reference Motion Vector Candidate Bank

Each buffer corresponds to a unique reference frame type, corresponding to a single or a pair of reference frames, covering single and compound inter modes respectively. All the buffers are the same size. When a new MV is added to a buffer that is full, an existing MV may be evicted to make room for the new one.

Coding blocks may refer to the MV candidate bank to collect reference MV candidates, in addition to the ones obtained with the conventional AV1 reference MV list generation. After coding a superblock, the MV bank may be updated with the MVs used by the coding blocks of the superblock.

Each tile may have an independent MV reference bank that may be utilized by all superblocks within the tile. At the beginning of encoding each tile, the corresponding bank may be emptied. Thereafter, while coding each superblock within that tile, MVs from the bank may be used as MV reference candidates. At the end of encoding a superblock, the bank may be updated.

Bank Update

Figure 2:
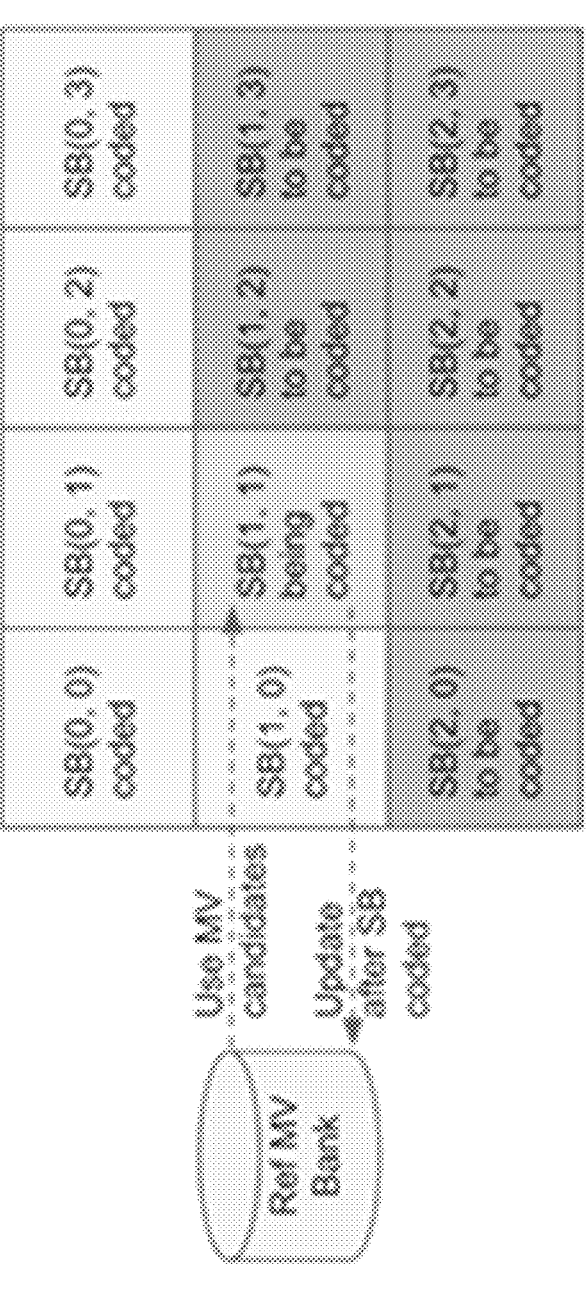
FIG. 2 illustrates reference motion vector candidate updating process in related art, according to an embodiment of the present disclosure.

As shown in diagram 200 in FIG. 2, the bank updating process may be based on superblock. That is, after the superblock is coded, the first (up to 64) candidate MVs used by each coding block inside the superblock are added to the bank. During updating, pruning process may also be involved during the updating.

Bank Referencing

After the conventional AV1 or new AV2 reference MV candidate scanning is done, if there are open slots in the candidate list, the codec may reference the MV candidate bank (in the buffer with matching reference frame type) for additional MV candidates. Going from the end backwards to the start of the buffer, the MV in the bank buffer may be appended to the candidate list if it does not already exist in the list.

MVP List Construction Process in the State-of-the-Art Design

In related art, as shown in the flowchart 300 in FIG. 3, the MVP list may be constructed with full pruning. An example may include operation 305 including adding adjacent SMVP, operation 310 including adding TMVP, operation 315 including adding non-adjacent SMVP, operation 320 including adding reordering process for the existing candidates, operation 325 including adding derived candidates, operation 330 including adding extra MVP candidates, and finally operation 355 including adding candidates from reference MV candidate bank.

Figure 4:
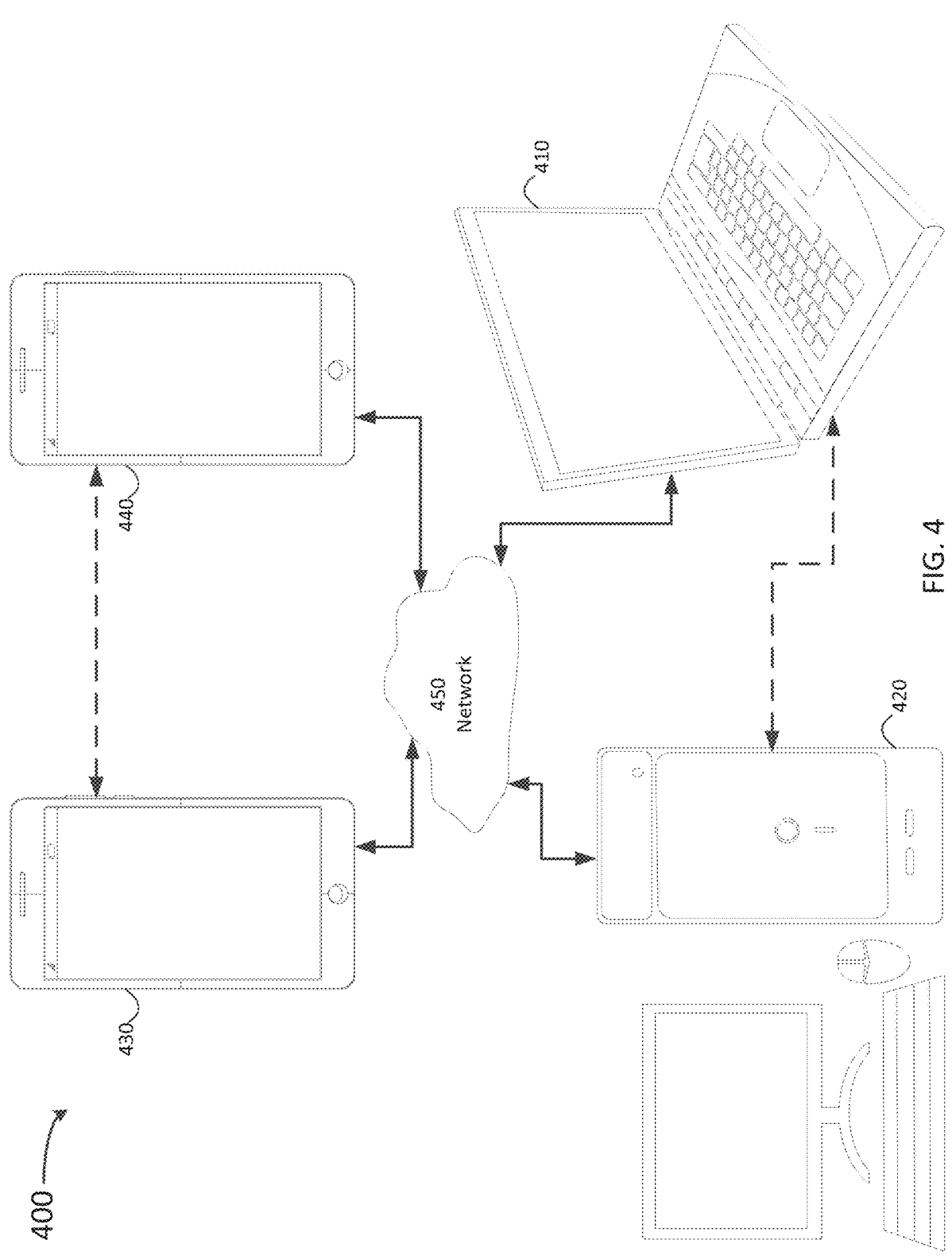
FIG. 4 is a simplified block diagram of a communication system, according to an embodiment of the present disclosure.

FIG. 4 illustrates a simplified block diagram of a communication system 400 according to an embodiment of the present disclosure. The communication system 400 may include at least two terminals 410-420 interconnected via a network 450. For unidirectional transmission of data, a first terminal 410 may code video data at a local location for transmission to the other terminal 420 via the network 450. The second terminal 420 may receive the coded video data of the other terminal from the network 450, decode the coded data, and display the recovered video data. Unidirectional data transmission may be common in media serving applications and the like.

FIG. 4 illustrates a second pair of terminals 430, 440 provided to support bidirectional transmission of coded video that may occur, for example, during videoconferencing. For bidirectional transmission of data, each terminal 430, 440 may code video data captured at a local location for transmission to the other terminal via the network 450. Each terminal 430, 440 also may receive the coded video data transmitted by the other terminal, may decode the coded data and may display the recovered video data at a local display device.

In FIG. 4, the terminals 410-440 may be illustrated as servers, personal computers and smart phones but the principles of the present disclosure are not so limited. Embodiments of the present disclosure find application with laptop computers, tablet computers, media players and/or dedicated video conferencing equipment. The network 450 represents any number of networks that convey coded video data among the terminals 410-440, including for example wireline and/or wireless communication networks. The communication network 450 may exchange data in circuit-switched and/or packet-switched channels. Representative networks include telecommunications networks, local area networks, wide area networks, and/or the Internet. For the purposes of the present discussion, the architecture and topology of the network 450 may be immaterial to the operation of the present disclosure unless explained herein below.

Figure 5:
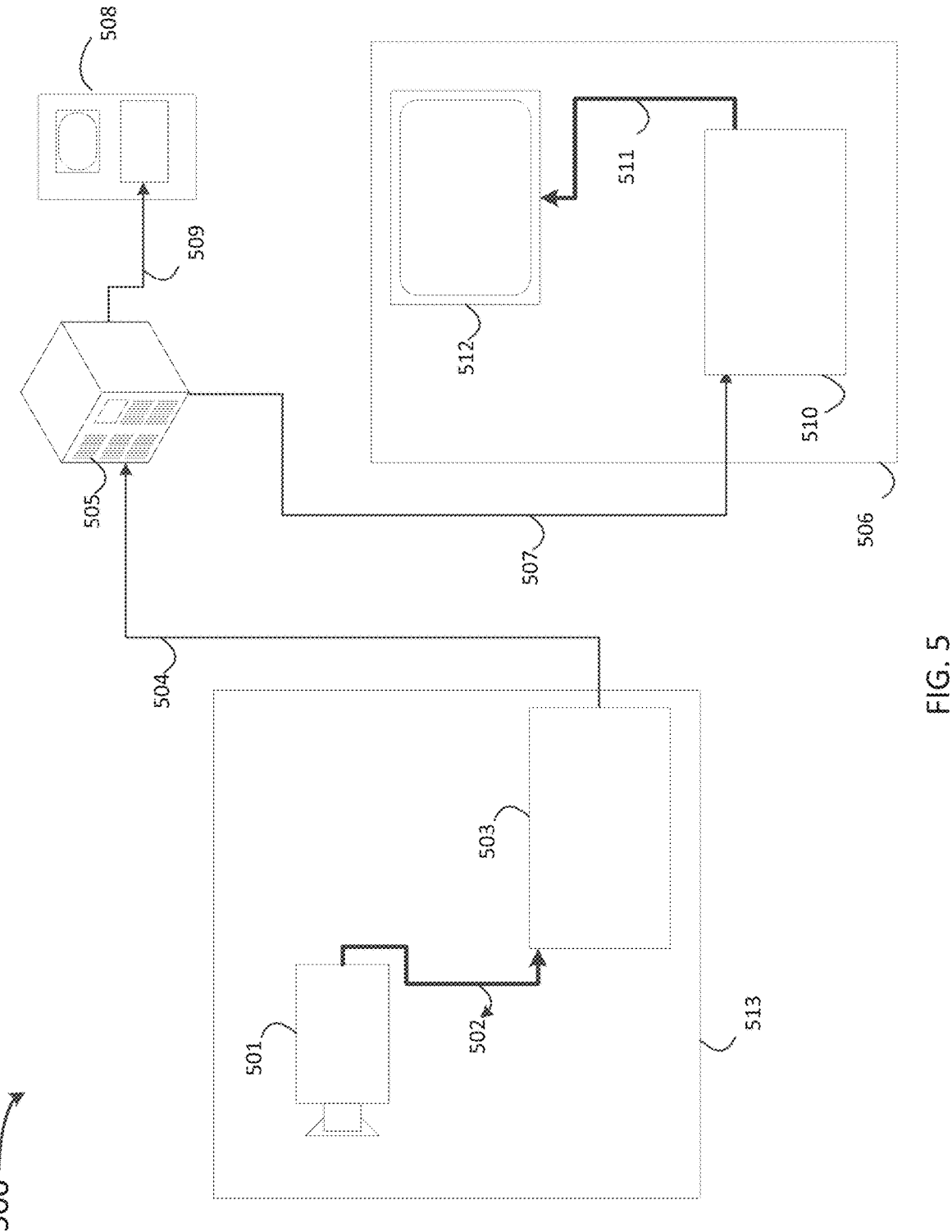
FIG. 5 is a diagram of the placement of a video encoder and decoder in a streaming environment.

FIG. 5 illustrates, as an example for an application for the disclosed subject matter, the placement of a video encoder and decoder in a streaming environment, for example streaming system 500. The disclosed subject matter can be equally applicable to other video enabled applications, including, for example, video conferencing, digital TV, storing of compressed video on digital media including CD, DVD, memory stick and the like, and so on.

A streaming system may include a capture subsystem 513, which can include a video source 501, for example a digital camera, creating, for example, an uncompressed video sample stream 502. That sample stream 502, depicted as a bold line to emphasize a high data volume when compared to encoded video bitstreams, can be processed by an encoder 503 coupled to the camera 501. The encoder 503 can include hardware, software, or a combination thereof to enable or implement aspects of the disclosed subject matter as described in more detail below. The encoded video bitstream 504, depicted as a thin line to emphasize the lower data volume when compared to the sample stream, can be stored on a streaming server 505 for future use. One or more streaming clients 506, 508 can access the streaming server 505 to retrieve copies 507, 509 of the encoded video bitstream 504. A client 506 can include a video decoder 510, which decodes the incoming copy of the encoded video bitstream 507 and creates an outgoing video sample stream 511 that can be rendered on a display 512 or other rendering device not depicted. In some streaming systems, the video bitstreams 504, 507, 509 can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 6:
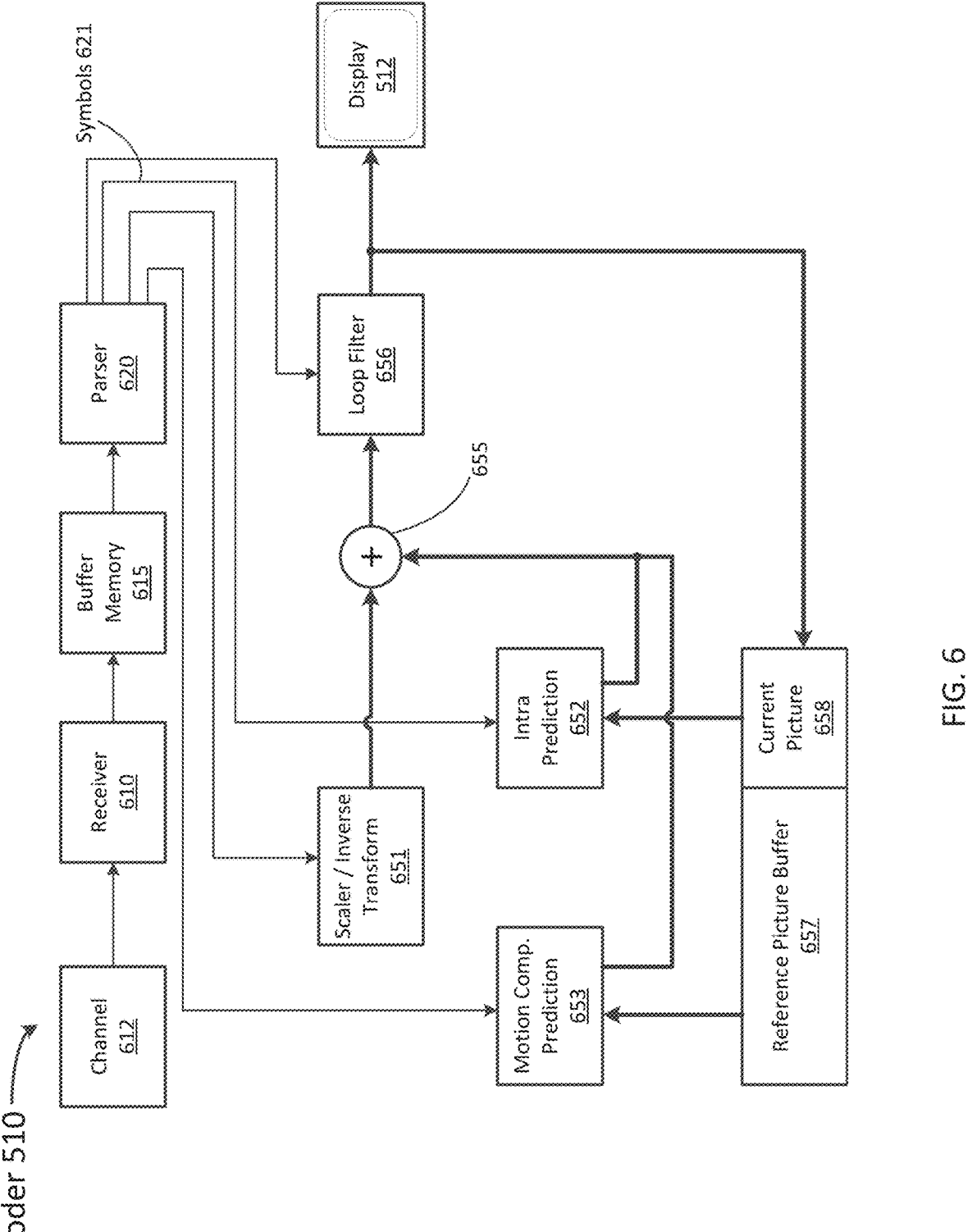
FIG. 6 is a functional block diagram of a video decoder, according to an embodiment of the present disclosure.

FIG. 6 may be a functional block diagram of a video decoder 510 according to an embodiment of the present invention.

A receiver 610 may receive one or more codec video sequences to be decoded by the decoder 510; in the same or another embodiment, one coded video sequence at a time, where the decoding of each coded video sequence is independent from other coded video sequences. The coded video sequence may be received from a channel 612, which may be a hardware/software link to a storage device, that stores the encoded video data. The receiver 610 may receive the encoded video data with other data, for example, coded audio data, and/or ancillary data streams, that may be forwarded to their respective using entities not depicted. The receiver 610 may separate the coded video sequence from the other data. To combat network jitter, a buffer memory 615 may be coupled in between receiver 610 and entropy decoder/parser 620 "parser" henceforth. When receiver 610 is receiving data from a store/forward device of sufficient bandwidth and controllability, or from an isosynchronous network, the buffer 615 may not be needed, or can be small. For use on best effort packet networks such as the Internet, the buffer 615 may be required, can be comparatively large, and can advantageously of adaptive size.

The video decoder 510 may include a parser 620 to reconstruct symbols 621 from the entropy coded video sequence. Categories of those symbols include information used to manage operation of the decoder 510, and potentially information to control a rendering device such as a display 512 that is not an integral part of the decoder but can be coupled to it, as was shown in FIG. 6. The control information for the rendering device(s may be in the form of Supplementary Enhancement Information SEI messages or Video Usability Information (VUI) parameter set fragments not depicted. The parser 620 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 620 may extract from the coded video sequence, a set of subgroup parameters for at least one of the subgroups of pixels in the video decoder, based upon at least one parameters corresponding to the group. Subgroups can include Groups of Pictures GOPs, pictures, tiles, slices, macroblocks, Coding Units CUs, blocks, Transform Units TUs, Prediction Units PUs and so forth. The entropy decoder/parser may also extract from the coded video sequence information such as transform coefficients, quantizer parameter QP values, motion vectors, and so forth.

The parser 620 may perform entropy decoding/parsing operation on the video sequence received from the buffer 615, so to create symbols 621. The parser 620 may receive encoded data, and selectively decode particular symbols 621. Further, the parser 620 may determine whether the particular symbols 621 are to be provided to a Motion Compensation Prediction unit 653, a scaler/inverse transform unit 651, an Intra Prediction Unit 652, or a loop filter 656.

Reconstruction of the symbols 621 can involve multiple different units depending on the type of the coded video picture or parts thereof such as inter and intra picture, inter and intra block, and other factors. Which units are involved, and how, can be controlled by the subgroup control information that was parsed from the coded video sequence by the parser 620. The flow of such subgroup control information between the parser 620 and the multiple units below is not depicted for clarity.

Beyond the functional blocks already mentioned, decoder 510 can be conceptually subdivided into a number of functional units as described below. In a practical implementation operating under commercial constraints, many of these units interact closely with each other and can, at least partly, be integrated into each other. However, for describing the disclosed subject matter, the conceptual subdivision into the functional units below is appropriate.

A first unit is the scaler/inverse transform unit 651. The scaler/inverse transform unit 651 receives quantized transform coefficient as well as control information, including which transform to use, block size, quantization factor, quantization scaling matrices, etc. as symbol(s 621 from the parser 620. It can output blocks comprising sample values that can be input into aggregator 655.

In some cases, the output samples of the scaler/inverse transform 651 can pertain to an intra coded block; that is: a block that is not using predictive information from previously reconstructed pictures, but can use predictive information from previously reconstructed parts of the current picture. An intra picture prediction unit 652 can provide such predictive information. In some cases, the intra picture prediction unit 652 generates a block of the same size and shape of the block under reconstruction, using surrounding already reconstructed information fetched from the current partly reconstructed picture 658. The aggregator 655, in some cases, adds, on a per sample basis, the prediction information the intra prediction unit 652 has generated to the output sample information as provided by the scaler/inverse transform unit 651.

In other cases, the output samples of the scaler/inverse transform unit 651 can pertain to an inter coded, and potentially motion compensated block. In such a case, a Motion Compensation Prediction unit 653 can access reference picture memory 657 to fetch samples used for prediction. After motion compensating the fetched samples in accordance with the symbols, the aggregator 655 to the output of the scaler/inverse can add 621 pertaining to the block, these samples transform unit in this case called the residual samples or residual signal so to generate output sample information. The addresses within the reference picture memory form where the motion compensation unit fetches prediction samples can be controlled by motion vectors, available to the motion compensation unit in the form of symbols 621 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 655 can be subject to various loop-filtering techniques in the loop filter unit 656. Video compression technologies can include in-loop filter technologies that are controlled by parameters included in the coded video bitstream and made available to the loop filter unit 656 as symbols 621 from the parser 620, but can also be responsive to meta-information obtained during the decoding of previous in decoding order parts of the coded picture or coded video sequence, as well as responsive to previously reconstructed and loop-filtered sample values.

The output of the loop filter unit 656 can be a sample stream that can be output to the render device 512 as well as stored in the reference picture memory 658 for use in future inter-picture prediction.

Certain coded pictures, once fully reconstructed, can be used as reference pictures for future prediction. Once a coded picture is fully reconstructed and the coded picture has been identified as a reference picture by, for example, parser 620), the current reference picture 658 can become part of the reference picture buffer 657, and a fresh current picture memory can be reallocated before commencing the reconstruction of the following coded picture.

The video decoder 510 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate measured in, for example mega samples per second, maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 610 may receive additional redundant data with the encoded video. The additional data may be included as part of the coded video sequence(s. The additional data may be used by the video decoder 510 to properly decode the data and/or to more accurately reconstruct the original video data. Additional data can be in the form of, for example, temporal, spatial, or signal-to-noise ratio SNR enhancement layers, redundant slices, redundant pictures, forward error correction codes, and so on.

Figure 7:
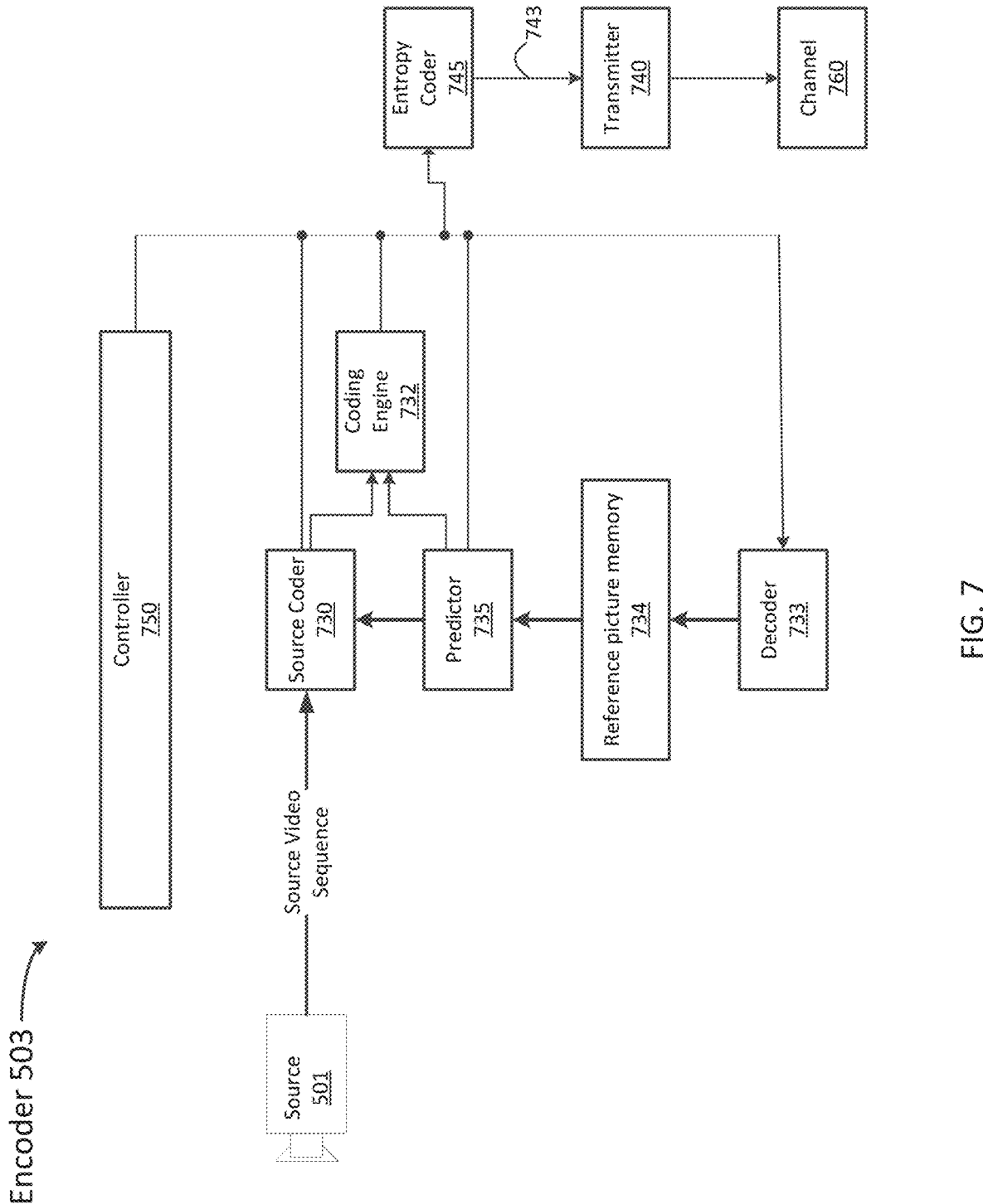
FIG. 7 is a functional block diagram of a video encoder, according to an embodiment of the present disclosure.

FIG. 7 may be a functional block diagram of a video encoder 503 according to an embodiment of the present disclosure.

The encoder 503 may receive video samples from a video source 501 that is not part of the encoder that may capture video images to be coded by the encoder 503.

The video source 501 may provide the source video sequence to be coded by the encoder 503 in the form of a digital video sample stream that can be of any suitable bit depth for example: 8 bit, 10 bit, 12 bit, . . . , any colorspace for example, BT.601 Y CrCB, RGB, . . . and any suitable sampling structure for example Y CrCb 4:2:0, Y CrCb 4:4:4. In a media serving system, the video source 501 may be a storage device storing previously prepared video. In a videoconferencing system, the video source 503 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 503 may code and compress the pictures of the source video sequence into a coded video sequence 743 in real time or under any other time constraints as required by the application. Enforcing appropriate coding speed is one function of Controller 750. Controller controls other functional units as described below and is functionally coupled to these units. The coupling is not depicted for clarity. Parameters set by controller can include rate control related parameters picture skip, quantizer, lambda value of rate-distortion optimization techniques, . . . , picture size, group of pictures GOP layout, maximum motion vector search range, and so forth. A person skilled in the art can readily identify other functions of controller 750 as they may pertain to video encoder 503 optimized for a certain system design.

Some video encoders operate in what a person skilled in the art readily recognizes as a "coding loop." As an oversimplified description, a coding loop can consist of the encoding part of an encoder 730 "source coder" henceforth responsible for creating symbols based on an input picture to be coded, and a reference picture(s), and a local decoder 733 embedded in the encoder 503 that reconstructs the symbols to create the sample data that a remote decoder also would create as any compression between symbols and coded video bitstream is lossless in the video compression technologies considered in the disclosed subject matter. That reconstructed sample stream is input to the reference picture memory 734. As the decoding of a symbol stream leads to bit-exact results independent of decoder location local or remote, the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity and resulting drift, if synchronicity cannot be maintained, for example because of channel errors is well known to a person skilled in the art.

The operation of the "local" decoder 733 can be the same as of a "remote" decoder 510, which has already been described in detail above in conjunction with FIG. 6. Briefly referring also to FIG. 7, however, as symbols are available and en/decoding of symbols to a coded video sequence by entropy coder 745 and parser 620 can be lossless, the entropy decoding parts of decoder 510, including channel 612, receiver 610, buffer 615, and parser 620 may not be fully implemented in local decoder 733.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 730 may perform motion compensated predictive coding, which codes an input frame predictively with reference to one or more previously-coded frames from the video sequence that were designated as "reference frames." In this manner, the coding engine 732 codes differences between pixel blocks of an input frame and pixel blocks of reference frame(s that may be selected as prediction reference(s to the input frame.

The local video decoder 733 may decode coded video data of frames that may be designated as reference frames, based on symbols created by the source coder 730. Operations of the coding engine 732 may advantageously be lossy processes. When the coded video data may be decoded at a video decoder not shown in FIG. 7, the reconstructed video sequence typically may be a replica of the source video sequence with some errors. The local video decoder 733 replicates decoding processes that may be performed by the video decoder on reference frames and may cause reconstructed reference frames to be stored in the reference picture cache 734. In this manner, the encoder 503 may store copies of reconstructed reference frames locally that have common content as the reconstructed reference frames that will be obtained by a far-end video decoder absent transmission errors.

The predictor 735 may perform prediction searches for the coding engine 732. That is, for a new frame to be coded, the predictor 735 may search the reference picture memory 734 for sample data as candidate reference pixel blocks or certain metadata such as reference picture motion vectors, block shapes, and so on, that may serve as an appropriate prediction reference for the new pictures. The predictor 735 may operate on a sample block-by-pixel block basis to find appropriate prediction references. In some cases, as determined by search results obtained by the predictor 735, an input picture may have prediction references drawn from multiple reference pictures stored in the reference picture memory 734.

The controller 750 may manage coding operations of the video coder 730, including, for example, setting of parameters and subgroup parameters used for encoding the video data.

Output of all aforementioned functional units may be subjected to entropy coding in the entropy coder 745. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 740 may buffer the coded video sequence(s as created by the entropy coder 745 to prepare it for transmission via a communication channel 760, which may be a hardware/software link to a storage device which would store the encoded video data. The transmitter 740 may merge coded video data from the video coder 730 with other data to be transmitted, for example, coded audio data and/or ancillary data streams sources not shown.

The controller 750 may manage operation of the encoder 503. During coding, the controller 750 may assign to each coded picture a certain coded picture type, which may affect the coding techniques that may be applied to the respective picture. For example, pictures often may be assigned as one of the following frame types:

An Intra Picture I picture may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture P picture may be one that may be coded and decoded using intra prediction or inter prediction using at most one motion vector and reference index to predict the sample values of each block.

A Bi-directionally Predictive Picture B Picture may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks for example, blocks of 4×4, 8×8, 4×8, or 16×16 samples each and coded on a block-by-block basis. Blocks may be coded predictively with reference to other already coded blocks as determined by the coding assignment applied to the blocks' respective pictures. For example, blocks of I pictures may be coded non-predictively or they may be coded predictively with reference to already coded blocks of the same picture spatial prediction or intra prediction. Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 503 may perform coding operations according to a predetermined video coding technology or standard, such as ITU-T Rec. H.265. In its operation, the video coder 503 may perform various compression operations, including predictive coding operations that exploit temporal and spatial redundancies in the input video sequence. The coded video data, therefore, may conform to a syntax specified by the video coding technology or standard being used.

In an embodiment, the transmitter 740 may transmit additional data with the encoded video. The video coder 730 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 8A:
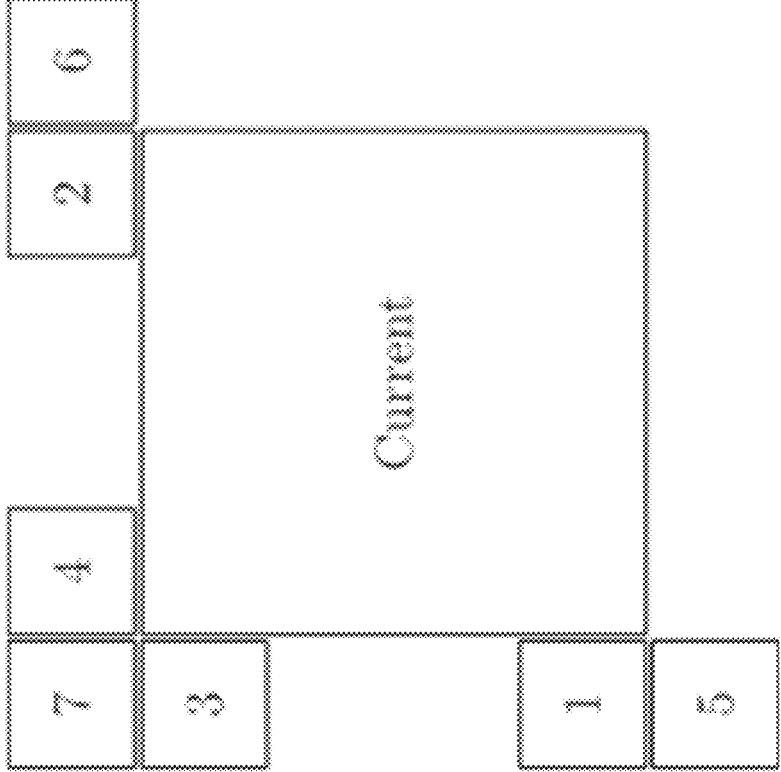
FIG. 8A is an exemplary diagram of interleaved MVP candidates' insertion, according to an embodiment of the present disclosure.

FIG. 8A illustrates an exemplary interleaved MVP candidate insertion for block 800.

Present disclosure relates to an interleaved scan order for adjacent spatial motion vector predictors to utilize the similarity more efficiently between the current MV and spatial neighboring MVs.

In an embodiment, a first adjacent SMVP from the left (or above) neighbor may be inserted into the MVP list, then an SMVP from above (or left), may be inserted, followed by continued insertion of the adjacent SMVPs interleaved until all adjacent SMVPs have been used or pruned. As an example, referring to block 800 in FIG. 8A, the adjacent SMVP from neighboring blocks may be scanned in the order {1, 2, 3, 4, 5, 6, 7}. It may be assumed that all candidates may be of a pre-defined size.

It may be understood that the SMVP associated with the top left corner candidate can be inserted at last of the adjacent SMVPs or counted as left or above candidate to insert it at any position, or counted as non-adjacent candidate and thus not be inserted during processing the adjacent SMVPs.

According to an embodiment, the motion vectors (also referred to interchangeably with "motion vector predictor" or "candidate") in the MVP list may be weighted, and the weight may be accumulated. In some embodiments, one or more motion vector candidates' weight may not be accumulated. As an example, the weighting associated with the one or more motion vector candidates whose weight may not be accumulated (e.g., candidate 7) may be zero. In some embodiments, during counting a context for context modeling of a syntax element (e.g., for reference picture index signaling or new MV signaling), one or some candidate motion vectors may not be counted (e.g., candidate 7). According to an embodiment, a block size of the candidate may be used during the weighting process or accumulation.

Pruning may include not inserting a motion vector into the MVP list or removing a motion vector from the MVP list if the incoming SMVP candidate has the same MVP as one already existing in the MVP list. In some embodiments, partial pruning may be performed instead of full pruning. As an example, for a certain motion vector candidate (e.g., candidate 4) or for a motion vector candidate satisfying a condition, no pruning operation may be performed.

In some embodiments, in addition to the above-mentioned features, the interleaved scanning and/or inserting of the candidates may begin by inserting a first adjacent SMVP from the top and near the right corner may be inserted into the MVP list followed by a second adjacent SMVP from left and near the bottom corner. Such an embodiment may enable a more efficient utilization of the MVP list to include more relevant neighbors when the above-neighbors are more frequently used. As an example, this scanning order going from top to left may benefit when the video content is vertical or contains vertical motions. As an example, As an example, referring to block 800 in FIG. 8A, the adjacent SMVP from neighboring blocks may be scanned in the order {2, 1, 4, 3, 6, 5, 7}.

In one embodiment, referring to block 800 in FIG. 8A, the adjacent SMVP from neighboring blocks may be scanned in the order {1, 2, 5, 6, 7, 4, 3}. In this embodiment, more different MVPs (assuming 3 has higher chance contain a similar MVP as 1, while 5 has a higher chance to be different from 1) can be inserted to the MVP list. As another embodiment, referring to block 800 in FIG. 8A, the adjacent SMVP from neighboring blocks may be scanned in the order {2, 1, 6, 5, 7, 3, 4}. An advantage of this embodiment is that if the above neighbors are more frequently used (e.g., vertical video contents or videos contains vertical motions), the MVP is more efficient.

According to an embodiment, whether a SMVP associated with an adjacent neighbor from the top is added to the MVP list before SMVP associated with an adjacent neighbor from the left may be based on coded information or any information that may be available for both encoder and decoder when coding the current block, including, but not limited block shape, block size, block aspect ratio. As an example, when the block width is greater than block height, the left neighbors are added first to the MVP list. Referring to block 800 in FIG. 8A, the scan order of adjacent SMVP from neighboring blocks {2, 1, 4, 3, 6, 5, 7}. As another example, when the block height is greater than block width, the left neighbors are added first to the MVP list. Referring to block 800 in FIG. 8A, the scan order of adjacent SMVP from neighboring blocks {1, 2, 3, 4, 5, 6, 7}.

In an embodiment, referring to block 800 in FIG. 8A, the motion vectors of the above neighboring blocks located between candidate 4 and 2, and/or the motion vectors of the left neighboring blocks located between candidates 3 and 1 maybe inserted into the MVP candidate list after motion vectors of part or all the 7 positions being listed into the MVP candidate list. In some embodiments, whether to insert the motion vectors of the above neighboring blocks located between candidates 4 and 2, and/or the motion vectors of the left neighboring blocks located between candidates 3 and 1 into the MVP list may depend on the coded information or any information that is available for both encoder and decoder when coding the current block, including, but not limited block shape, block size, block aspect ratio, whether the left or above neighbor is selected as the MVP candidate for neighboring blocks.

In an embodiment, when block width is equal to or greater than block height, the motion vectors of the above neighboring blocks located between candidates 4 and 2 may be inserted into the MVP candidate list after the motion vectors of neighboring blocks located at all the 7 positions.

In another embodiment, when block width is equal to or less than block height, the motion vectors of the left neighboring blocks located between candidates 3 and 1 are inserted into the MVP candidate list after the motion vectors of neighboring blocks located at all the 7 positions.

Figure 8B:
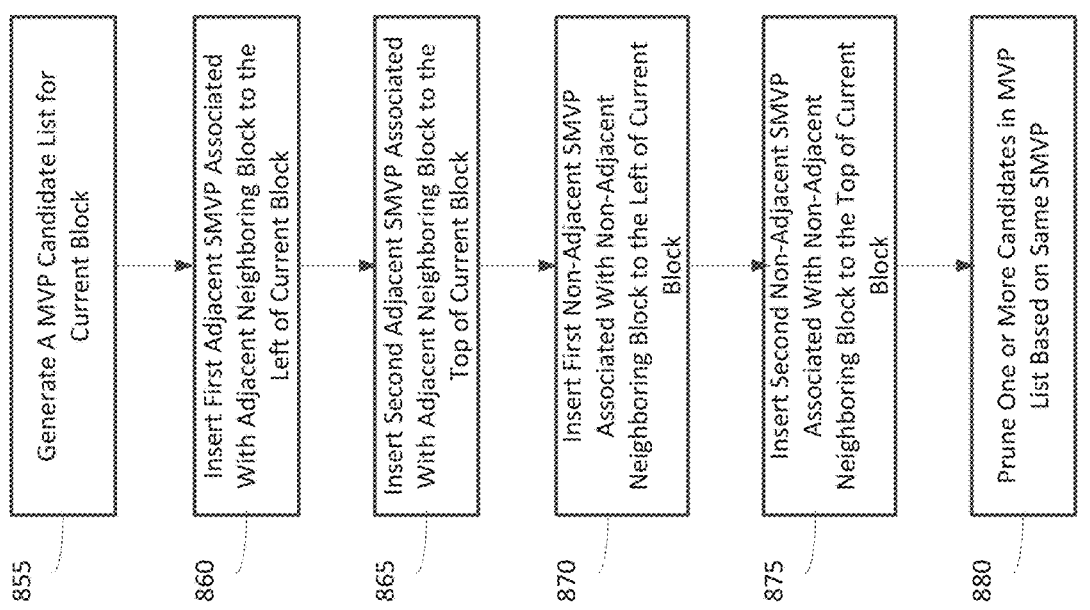
FIG. 8B is a flowchart of an example process for video coding and decoding, according to an embodiment of the present disclosure.

FIG. 8B illustrates an exemplary process 850 to generate a MVP list for the current block 800 based on interleaving adjacent and non-adjacent candidates.

At operation 855, a MVP candidate list may be generated for a current block based on spatial motion vectors associated with neighboring blocks and non-neighboring blocks. In some embodiments, each candidate motion vector predictor in the MVP candidate list may be associated with an accumulated weight, wherein the accumulated weight may indicate an importance associated with each candidate motion vector predictor. Weight accumulation associated with the at least one candidate motion vector predictor may be prohibited based on determining the accumulated weight associated with at least one candidate motion vector predictor being zero. In some embodiments, the neighboring blocks and the non-neighboring blocks have a predetermined size.

At operation 860, a first spatial motion vector predictor (SMVP) associated with an adjacent neighboring block to the left of the current block may be inserted to the MVP candidate list.

At operation 865, a second SMVP associated with an adjacent neighboring block to the top of the current block may be inserted to the MVP candidate list.

In some embodiments, based on a first condition being satisfied, the first SMVP may be inserted prior to the second SMVP. As an example, wherein the first condition is one of a width of the current block is greater than a height of the current block; and the height of the current block is greater than the width of the current block.

In some embodiments, based on a second condition being satisfied, the second SMVP may be inserted prior to the first SMVP. As an example, the second condition may be one of a width of the current block is greater than a height of the current block; and the height of the current block is greater than the width of the current block.

In some embodiments, a fifth SMVP associated with an adjacent neighboring block to a top left corner of the current block may be to the MVP candidate list. The fifth SMVP may be inserted prior to the third SMVP and the fourth SMVP to the MVP candidate list.

At operation 870, a third SMVP associated with a non-adjacent neighboring block to the left of the current block may be inserted to the MVP candidate list. At operation 875, a fourth SMVP associated with a non-adjacent neighboring block to the top of the current block may be inserted to the MVP candidate list.

At operation 880, one or more candidates in the MVP candidate list may be pruned based on determining that the one or more candidates have a same SMVP. Pruning may include not inserting a motion vector into the MVP list or removing a motion vector from the MVP list if the incoming SMVP candidate has the same MVP as one already existing in the MVP list. In some embodiments, partial pruning may be performed instead of full pruning. As an example, for a certain motion vector candidate or for a motion vector candidate satisfying a condition, no pruning operation may be performed.

Although FIG. 8B shows example blocks of process 850, in some implementations, process 800 may include additional blocks, fewer blocks, different blocks, or differently arranged blocks than those depicted in FIG. 8. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions, and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
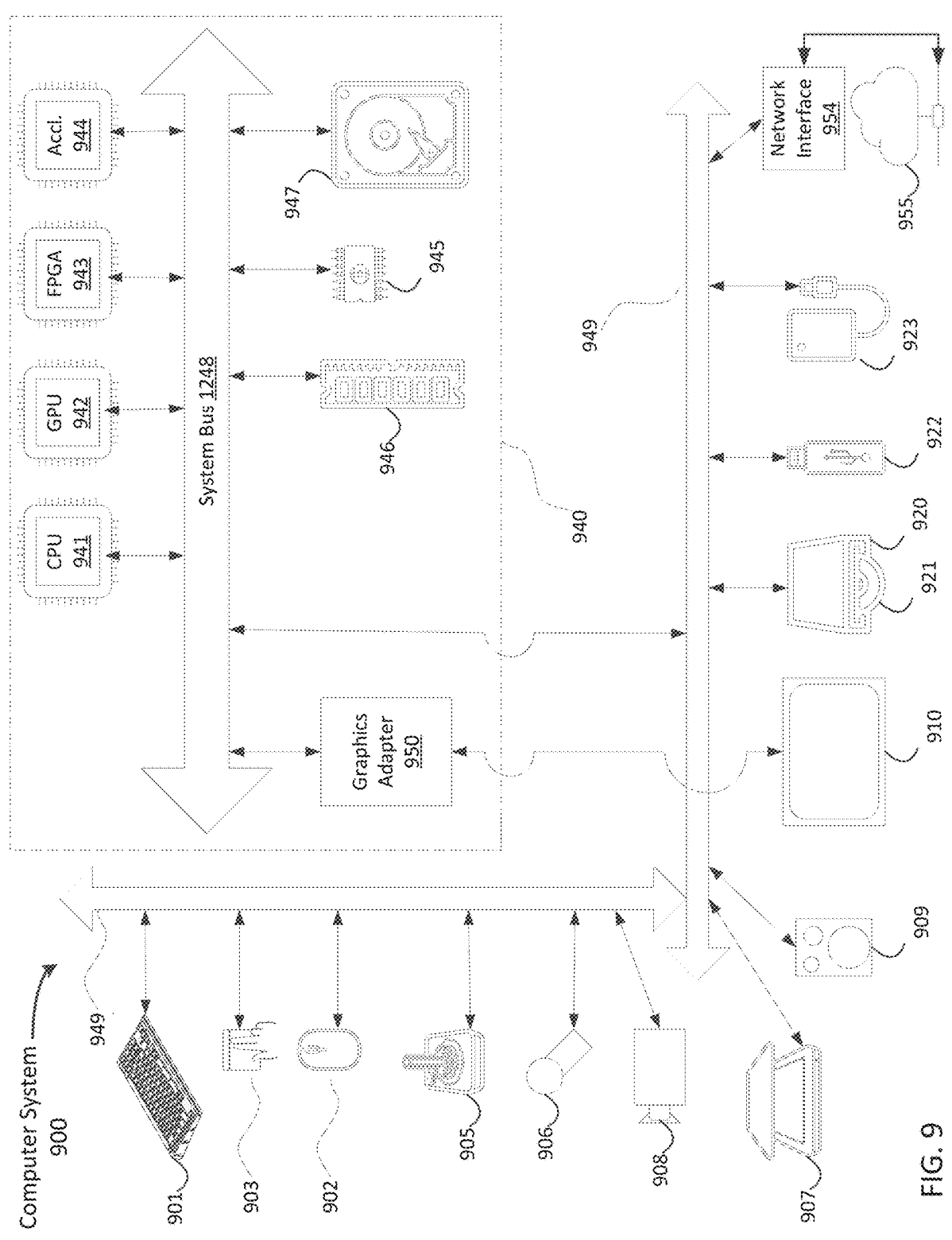
FIG. 9 is a diagram of a computer system, according to an embodiment of the present disclosure.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove 1204, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove 1204, or joystick 905, but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks (955) commonly require external network interface adapters (954) that attached to certain general purpose data ports or peripheral buses (949) (such as, for example USB ports of the computer system (900); others are commonly integrated into the core of the computer system (900) by attachment to a system bus as described below (for example Ethernet interface into a PC computer system or cellular network interface into a smartphone computer system). Using any of these networks (955), computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces (954) as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory (RAM) 946, internal mass storage such as internal non-user accessible hard drives, solid-state drives (SSDs), and the like 947, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 949. Architectures for a peripheral bus include peripheral component interconnect (PCI), USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:
receiving a video bitstream comprising a plurality of blocks, including a current block;
generating a motion vector prediction (MVP) list for the current block by interleaving respective spatial motion vector predictors (SMVPs) from left and above neighboring blocks, including:
    inserting a first SMVP into the MVP list, the first SMVP corresponding to a left neighboring block that is left of the current block; and
    inserting a second SMVP into the MVP list, the second SMVP corresponding to a top neighboring block that is above the current block; and
decoding the current block using an MVP from the MVP list.

2. The method of claim 1, further comprising pruning one or more candidates from the MVP list based on determining that the one or more candidates have a same SMVP.

3. The method of claim 2, wherein the pruning is performed on only a portion of the MVP list.

4. The method of claim 1, wherein generating the MVP further includes:
inserting a third SMVP into the MVP list, the third SMVP corresponding to the left neighboring block; and
inserting a fourth SMVP into the MVP list, the fourth SMVP corresponding to the top neighboring block.

5. The method of claim 4, wherein generating the MVP further includes:
inserting a fifth SMVP into the MVP list, the fifth SMVP corresponding to a bottom-left neighboring block; and
inserting a sixth SMVP into the MVP list, the sixth SMVP corresponding to a top-right neighboring block.

6. The method of claim 5, wherein generating the MVP further includes inserting a seventh SMVP into the MVP list, the seventh SMVP corresponding to a top-left neighboring block.

7. The method of claim 1, further comprising assigning respective weights to motion vectors (MVs) of the MVP list.

8. The method of claim 7, wherein one or more of the MVs in the MVP list are assigned a weight of zero.

9. The method of claim 1, wherein, when one or more conditions are satisfied, the first SMVP is inserted into the MVP list before the second SMVP.

10. The method of claim 9, wherein, when one or more conditions are satisfied, the first SMVP is inserted into the MVP list after the second SMVP.

11. The method of claim 9, wherein the one or more conditions correspond to one or more of: a width of the current block, and a height of the current block.

12. The method of claim 9, wherein the one or more conditions correspond to whether a left or above neighboring block is selected as an MVP candidate.

13. A computing system, comprising:

control circuitry;

memory; and one or more sets of instructions stored in the memory and configured for execution by the control circuitry, the one or more sets of instructions comprising instructions for:

receiving video data comprising a plurality of blocks corresponding to one or more pictures, the plurality of blocks including a current block;

generating a motion vector prediction (MVP) list for the current block by interleaving respective spatial motion vector predictors (SMVPs) from left and above neighboring blocks, including:

inserting a first SMVP into the MVP list, the first SMVP corresponding to a left neighboring block that is left of the current block; and inserting a second SMVP into the MVP list, the second SMVP corresponding to a top neighboring block that is above the current block; and encoding the current block using an MVP from the MVP list.

14. The computing system of claim 13, wherein generating the MVP further includes:

inserting a third SMVP into the MVP list, the third SMVP corresponding to the left neighboring block; and inserting a fourth SMVP into the MVP list, the fourth SMVP corresponding to the top neighboring block.

15. The computing system of claim 14, wherein generating the MVP further includes:

inserting a fifth SMVP into the MVP list, the fifth SMVP corresponding to a bottom-left neighboring block; and inserting a sixth SMVP into the MVP list, the sixth SMVP corresponding to a top-right neighboring block.

16. The computing system of claim 15, wherein generating the MVP further includes inserting a seventh SMVP into the MVP list, the seventh SMVP corresponding to a top-left neighboring block.

17. The computing system of claim 13, wherein the one or more sets of instructions further comprises instructions for assigning respective weights to motion vectors (MVs) of the MVP list.

18. The computing system of claim 13, wherein the one or more sets of instructions further comprises instructions for pruning one or more candidates from the MVP list based on determining that the one or more candidates have a same SMVP.

19. The computing system of claim 13, wherein, when one or more conditions are satisfied, the first SMVP is inserted into the MVP list before the second SMVP.

20. A method of obtaining a video bitstream, the method comprising:

generating a video bitstream, including:

receiving video data comprising a plurality of blocks corresponding to one or more pictures, the plurality of blocks including a current block;

generating a motion vector prediction (MVP) list for the current block by interleaving respective spatial motion vector predictors (SMVPs) from left and above neighboring blocks, including:

inserting a first SMVP into the MVP list, the first SMVP corresponding to a left neighboring block that is left of the current block; and inserting a second SMVP into the MVP list, the second SMVP corresponding to a top neighboring block that is above the current block; and encoding the current block using an MVP from the MVP list; and transmitting the video bitstream including the encoded current block.

* * * * *